(12) United States Patent
Ovokaitys

(10) Patent No.: US 10,384,985 B2
(45) Date of Patent: *Aug. 20, 2019

(54) METHODS AND COMPOSITIONS FOR INCREASING THE YIELD OF, AND BENEFICIAL CHEMICAL COMPOSITION OF, CERTAIN PLANTS

(71) Applicant: Todd Frank Ovokaitys, Carlsbad, CA (US)

(72) Inventor: Todd Frank Ovokaitys, Carlsbad, CA (US)

(73) Assignee: B.K. Consultants, Inc., Corona Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,721

(22) Filed: Sep. 1, 2017

(65) Prior Publication Data

US 2018/0127327 A1 May 10, 2018

Related U.S. Application Data

(63) Continuation-in-part of application No. 14/731,036, filed on Jun. 4, 2015, now Pat. No. 10,040,728.
(Continued)

(51) Int. Cl.
*C05G 3/00* (2006.01)
*C05F 11/00* (2006.01)
(Continued)

(52) U.S. Cl.
CPC ............. *C05G 3/0082* (2013.01); *A01G 7/04* (2013.01); *B01J 19/121* (2013.01); *C05B 7/00* (2013.01);
(Continued)

(58) Field of Classification Search
CPC ....................................................... C05D 9/00
See application file for complete search history.

(56) References Cited

U.S. PATENT DOCUMENTS 3,703,576 A 11/1972 Kitajima
4,840,174 A 6/1989 Gluckman
(Continued)

FOREIGN PATENT DOCUMENTS

EP 1011697 6/2000
EP 1292134 A2 3/2003
(Continued)

OTHER PUBLICATIONS

International Search Report for PCT/US17/049976, dated Dec. 20, 2017.
(Continued)

*Primary Examiner* — Wayne A Langel
(74) *Attorney, Agent, or Firm* — Novel IP

(57) ABSTRACT

The present specification describes increasing the Brix degree, nutrient transport and density, and yields of *cannabis* crops through the application of photoacoustic resonance to a nutrient formulation. An activated nutrient solution is obtained by forming an unactivated nutrient solution and applying to the unactivated nutrient solution ultra-rapid impulses of modulated laser light, from one or more laser systems. An increase of at least 5% in the Brix degree of the crop, relative to an unactivated nutrient formulation, can be achieved. In addition, an increase of at least 5%, relative to an unactivated nutrient formulation, is seen with respect to nutrient density and crop yield through application of the activated nutrient solution.

22 Claims, 13 Drawing Sheets

Related U.S. Application Data

(60) Provisional application No. 62/383,091, filed on Sep. 2, 2016, provisional application No. 62/144,177, filed on Apr. 7, 2015, provisional application No. 62/009,024, filed on Jun. 6, 2014.

(51) Int. Cl.

| | | |
|---|---|---|
| C05D 9/00 | (2006.01) | |
| C05F 3/02 | (2006.01) | |
| C05D 9/02 | (2006.01) | |
| C05D 1/00 | (2006.01) | |
| C05D 3/00 | (2006.01) | |
| C05B 7/00 | (2006.01) | |
| C05C 1/00 | (2006.01) | |
| C05C 9/00 | (2006.01) | |
| C05G 1/00 | (2006.01) | |
| B01J 19/12 | (2006.01) | |
| C05C 3/00 | (2006.01) | |
| A01G 7/04 | (2006.01) | |

(52) U.S. Cl.
CPC ............... *C05C 1/00* (2013.01); *C05C 3/005* (2013.01); *C05C 9/005* (2013.01); *C05D 1/00* (2013.01); *C05D 3/00* (2013.01); *C05D 9/00* (2013.01); *C05D 9/02* (2013.01); *C05F 3/02* (2013.01); *C05F 11/00* (2013.01); *C05G 1/00* (2013.01); *C05G 3/0052* (2013.01); *C05G 3/0064* (2013.01); *C05G 3/0076* (2013.01)

(56) References Cited

U.S. PATENT DOCUMENTS

| | | |
|---|---|---|
| 5,571,797 A | 11/1996 | Ohno |
| 5,874,266 A | 2/1999 | Palsson |
| 6,064,500 A | 5/2000 | Strachan |
| 6,447,810 B1 | 9/2002 | Choi |
| 6,763,607 B2 | 7/2004 | Beyerinck |
| 6,811,564 B1 | 11/2004 | Strachan |
| 7,294,508 B2 | 11/2007 | Parikh |
| 7,427,502 B2 | 9/2008 | Gostjeva |
| 7,674,620 B2 | 3/2010 | Totey |
| 7,829,335 B2 | 11/2010 | Inoue |
| 8,173,632 B2 | 5/2012 | Ovokaitys |
| 8,313,477 B2 | 11/2012 | See |
| 8,377,989 B2 | 2/2013 | Ovokaitys |
| 8,404,733 B2 | 3/2013 | Ovokaitys |
| 8,748,178 B2 | 6/2014 | Egli |
| 8,788,213 B2 | 7/2014 | Bright |
| 10,040,728 B2 * | 8/2018 | Ovokaitys ............... C05G 3/00 |
| 2002/0034546 A1 | 3/2002 | Ullah |
| 2002/0058952 A1 | 5/2002 | Weber |
| 2003/0163931 A1 | 9/2003 | Beyerinck |
| 2004/0204746 A1 | 10/2004 | Ovokaitys |
| 2004/0230257 A1 | 11/2004 | Ovokaitys |
| 2004/0239044 A1 | 12/2004 | Blatter |
| 2004/0247671 A1 | 12/2004 | Prescott |
| 2005/0170506 A1 | 8/2005 | Sayre |
| 2005/0188921 A1 | 9/2005 | Malone |
| 2006/0013869 A1 | 1/2006 | Ignatious |
| 2006/0129210 A1 | 6/2006 | Cantin |
| 2007/0003615 A1 | 1/2007 | Jenkins |
| 2007/0154465 A1 | 7/2007 | Kharazi |
| 2007/0231307 A1 | 10/2007 | Tankovich |
| 2008/0064099 A1 | 3/2008 | Parikh |
| 2008/0176332 A1 | 7/2008 | Berns |
| 2008/0183162 A1 | 7/2008 | Altshuler |
| 2009/0131376 A1 | 5/2009 | Ovokaitys |
| 2009/0131710 A1 | 5/2009 | Ovokaitys |
| 2010/0015576 A1 | 1/2010 | Altshuler |
| 2010/0068141 A1 | 3/2010 | Kaushal |
| 2012/0041521 A1 | 2/2012 | Oron |
| 2012/0101479 A1 | 4/2012 | Paspaliaris |
| 2012/0129158 A1 | 5/2012 | Berns |
| 2012/0215156 A1 | 8/2012 | Ishikawa |
| 2012/0220641 A1 | 8/2012 | Ovokaitys |
| 2012/0258451 A1 | 10/2012 | Klimanskaya |
| 2014/0004601 A1 | 1/2014 | Lim |
| 2014/0093482 A1 | 4/2014 | Paspaliaris |
| 2014/0128800 A1 | 5/2014 | Kim |
| 2014/0200503 A1 | 7/2014 | Centurion |
| 2014/0273207 A1 | 9/2014 | Chan |
| 2014/0303546 A1 | 10/2014 | Badiavas |
| 2014/0311200 A1 | 10/2014 | Hartmann |
| 2014/0345342 A1 | 11/2014 | Ushijima |
| 2014/0352376 A1 | 12/2014 | Carpenter |
| 2014/0377831 A1 | 12/2014 | Ho |
| 2015/0027180 A1 | 1/2015 | Tuttle |
| 2015/0343234 A1 | 12/2015 | Ovokaitys |
| 2015/0353433 A1 | 12/2015 | Ovokaitys |
| 2016/0095281 A1* | 4/2016 | Drouillard ............ A01G 7/045 47/1.7 |
| 2017/0233717 A1 | 8/2017 | Ovokaitys |

FOREIGN PATENT DOCUMENTS

| | | |
|---|---|---|
| EP | 1421181 | 5/2004 |
| EP | 1892290 | 2/2008 |
| EP | 2248888 | 11/2010 |
| JP | 2008194055 | 8/2008 |
| RU | 2291703 | 1/2007 |
| SG | 172471 | 7/2011 |
| WO | 1995029645 | 2/1995 |
| WO | 1996039489 | 2/1996 |
| WO | 1998042356 | 2/1998 |
| WO | 0100563 A1 | 1/2001 |
| WO | 2001068110 | 1/2001 |
| WO | 02059087 A1 | 8/2002 |
| WO | 2003018783 | 1/2003 |
| WO | 2003029402 | 1/2003 |
| WO | 03020291 A1 | 3/2003 |
| WO | 2004071435 A2 | 8/2004 |
| WO | 2004081172 | 9/2004 |
| WO | 2006068649 A1 | 6/2006 |
| WO | 2007014323 | 2/2007 |
| WO | 2007100614 | 9/2007 |
| WO | 2008013985 A2 | 1/2008 |
| WO | 2008089292 | 7/2008 |
| WO | 2009050696 | 4/2009 |
| WO | 2009052246 A1 | 4/2009 |
| WO | 2009052248 A1 | 4/2009 |
| WO | 2010005557 | 1/2010 |
| WO | 2010124585 | 11/2010 |
| WO | 2010134007 | 11/2010 |
| WO | 2011100651 A1 | 8/2011 |
| WO | 2011109797 | 9/2011 |
| WO | 2012071393 | 5/2012 |
| WO | 2012122081 | 9/2012 |
| WO | 2012122081 A2 | 9/2012 |
| WO | 2012131558 | 10/2012 |
| WO | 2012178156 | 12/2012 |
| WO | 2013003557 A1 | 1/2013 |
| WO | 2013063406 | 5/2013 |
| WO | 2013141715 A1 | 9/2013 |
| WO | 2014185945 | 11/2014 |
| WO | 2015053694 | 4/2015 |
| WO | 2015184421 A1 | 12/2015 |
| WO | 2015187974 A1 | 12/2015 |
| WO | 2017083755 A1 | 5/2017 |

OTHER PUBLICATIONS

Johnston, "The First Illinois Cannabis Farm", Nov. 19, 2015 (Nov. 19, 2015), retrieved on Nov. 17, 2017, https://www.agriculture.com/crops/other-crops/specialty-crops/first-illinois-cnabis-farm_168-ar51209; entire document.

Brenneisen, "Chemistry and Analysis of Phytocannabinoids and Other Cannabis Constituents", (2007), In: ElSohly M.A. (eds) Marijuana and the Cannabinoids. Forensic Science and Medicine. Humana Press.; entire document.

(56) References Cited

OTHER PUBLICATIONS

Office Action dated Jun. 12, 2017 for U.S. Appl. No. 14/731,036; (pp. 1-6).
Office Action dated Dec. 1, 2017 for U.S. Appl. No. 14/731,036; (pp. 1-5).
Ong, Wei-Kee et al., The activation of directional stem cell motility by green light-emitting diode irradiation, Dec. 19, 2012, Biomaterials, 34: pp. 1911-1920.
Extended European Search Report for EP15799255.3, dated Feb. 1, 2018.
International Search Report for PCT/US15/34236, dated Sep. 18, 2015.
International Search Report for PCT/US11/24694, Apr. 25, 2011.
International Search Report for PCT/US04/03752, dated Sep. 7, 2006.
International Search Report for PCT/US08/80098, dated Feb. 20, 2009.
International Search Report for PCT/US08/80095, dated Dec. 16, 2008.
Office Action dated Nov. 3, 2016 for U.S. Appl. No. 14/726,457.
Office Action dated Jul. 21, 2017 for U.S. Appl. No. 14/726,457; (pp. 1-18).
Taylor et al., "Banking on human embryonic stem cells: estimating the number of donor cell lines needed for HLA matching", Lancet, Dec. 10, 2005; 366: pp. 2019-2025.
Office Action dated Aug. 10, 2017 for U.S. Appl. No. 15/349,886; (pp. 1-26).
International Search Report for PCT/US15/33425, dated Sep. 29, 2015.
Gatrix, "Supplementing with Light." www.cam-mag.com, CAM Nov. 2012 (2012), enitre document [online] URL=<http://perfect-tp.dyndns-ip.com/DT/perfect/images/mg_cam.pdf>.
International Search Report for PCT/US16/61673, dated Mar. 2, 2017.
Office Action dated Dec. 27, 2017 for U.S. Appl. No. 14/726,457; (pp. 1-7).

\* cited by examiner

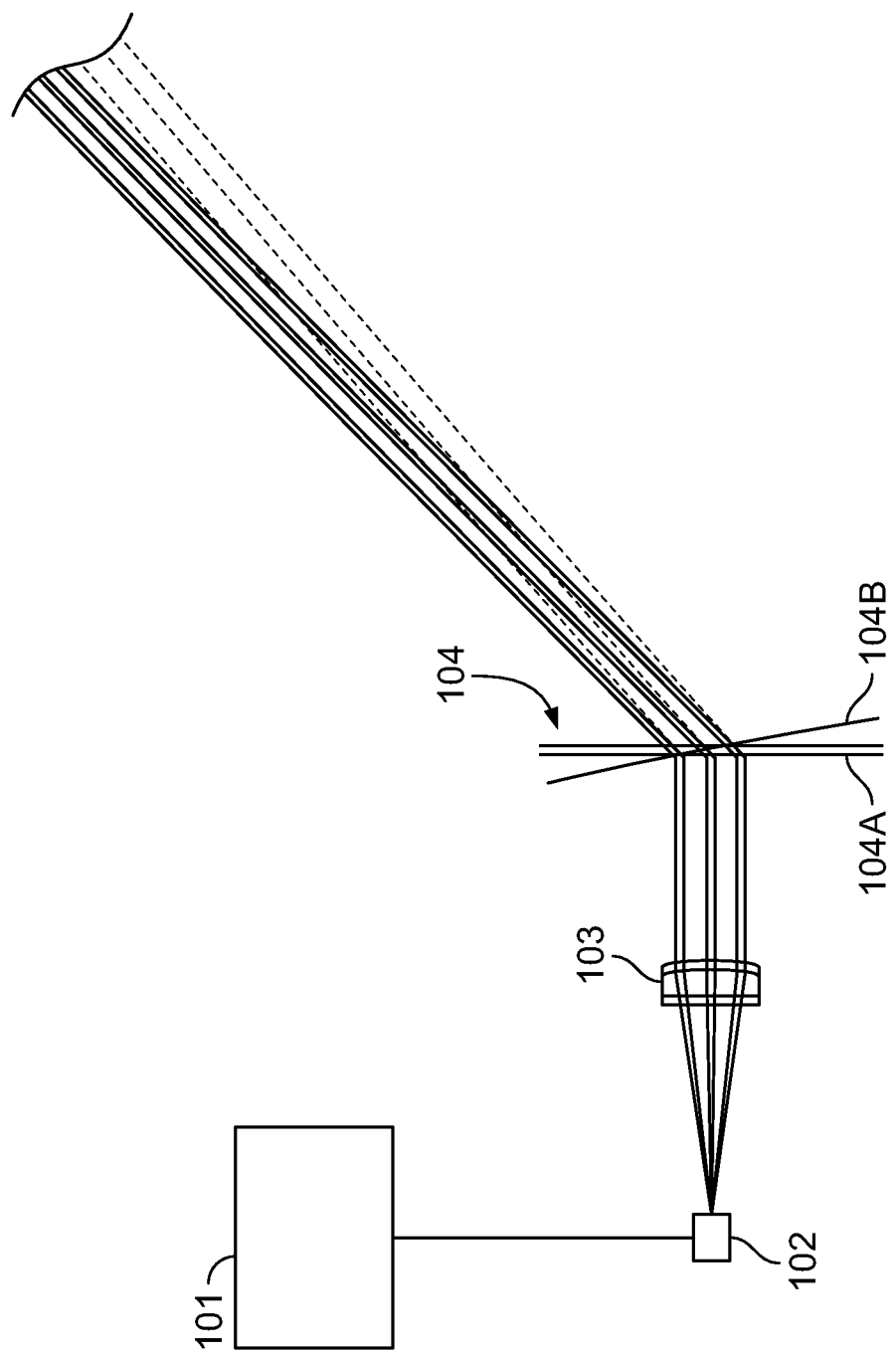

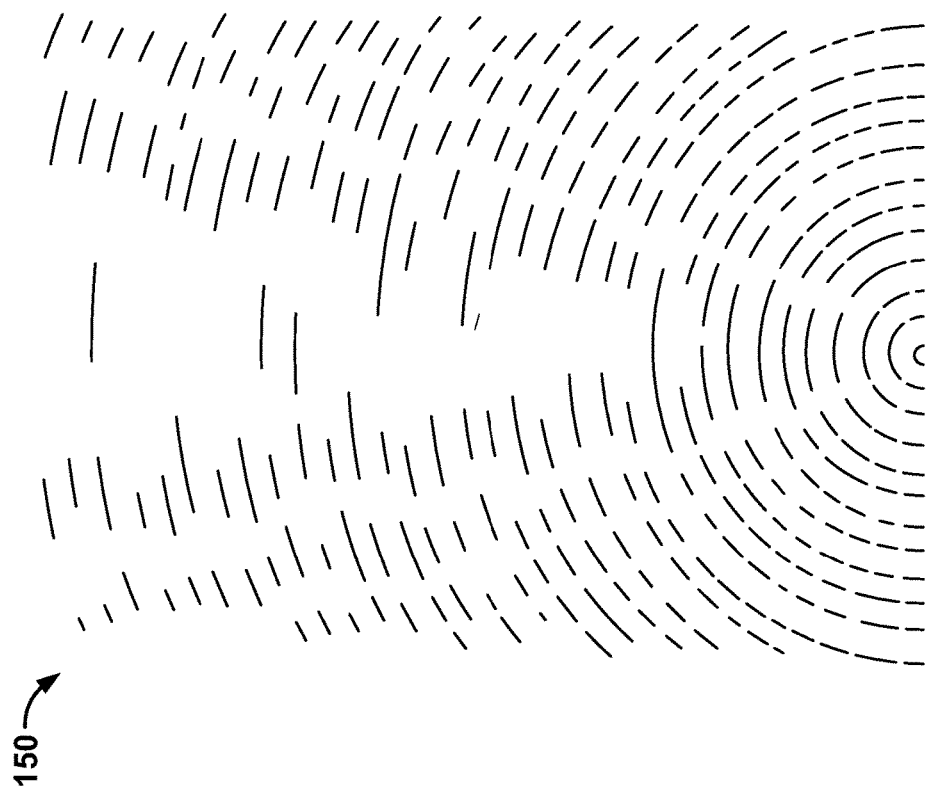

Table 1. Constituents of C. sativa L. by chemical class

| Chemical Class | Known Constituent |
|---|---|
| Cannabinoids | 70 |
|   CBG type | 7 |
|   CBC type | 5 |
|   CBD type | 7 |
|   $\Delta^9$-THC type | 9 |
|   $\Delta^8$-THC type | 2 |
|   CBL type | 3 |
|   CBE type | 5 |
|   CBN type | 7 |
|   CBND type | 2 |
|   CBT type | 9 |
|   Misc type | 14 |
| Nitrogenous compounds | 27 |
| Amino acids | 18 |
| Proteins, enzymes and glycoproteins | 11 |
| Sugars and related compounds | 34 |
| Hydrocarbons | 50 |
| Simple alocohols | 7 |
| Simple aldehydes | 12 |
| Simple ketones | 13 |
| Simple acids | 21 |
| Fatty acids | 33 |
| Simple esters and lactones | 13 |
| Steroids | 11 |
| Terpenes | 140 |
| Non-cannabinoid phenols | 34 |
| Flavonoids | 23 |
| Vitamins | 1 |
| Pigments | 2 |
| Elements | 9 |

FIG. 4

| Terpene Fingerprinting Supplement Certificate |
| --- |
| Client name: Patricia Cohen |
| Sample name: Super Silver Haze (Control) |
| Sample ID: D06247758 |
| Certificate No.A5683C |

Sample mass 0.0835

| Terpene | Conc (ppm) | mg/g |
| --- | --- | --- |
| α-pinene | 412.11 | 0.5 |
| Camphene | 0.00 | 0.0 |
| Myrcene | 3792.66 | 4.5 |
| Carene | 660.06 | 0.8 |
| B-Pinene | 0.00 | 0.0 |
| Limonene | 1289.59 | 1.5 |
| Eucalyptol | 0.00 | 0.0 |
| Terpinolene | 38.17 | 0.0 |
| Linalool | 857.57 | 1.0 |
| p-Cymene | 60.93 | 0.1 |
| Geraniol | 2.92 | 0.0 |
| B-Caryophyllene | 2777.52 | 3.3 |
| Humulene | 1031.96 | 1.2 |
| Nerolidol | 262.27 | 0.3 |
| Caryophyllene Oxide | 6.02 | 0.0 |
| Bisabolol | 193.01 | 0.2 |
|  |  | 13.6 |

| CLIENT | CMR | STRAIN | | Formula |
|---|---|---|---|---|
| SAMPLE TYPE | Flower | DATE OF ANALYSIS | | 12/01/2015 |
| CSA LAB ID NO. | D06245745 | RECEIVED ON | | 11/30/2015 |
| SAMPLE ID NO. | NA | EXPIRATION DATE | | 1/01/2016 |
| LOT NO. | NA | TEST METHODS | | P-007 |
| MOISTURE CONTENT | 15.95 % | WATER ACTIVITY | | 0.661 |
| CANNABINOID | | CONCENTRATION (mg/g) | | PERCENT by MASS |
| Delta 9 Tetrahydrocannabinol | D9 THC | 218.35 | | 21.83% |
| Cannabidiol | CBD | 1.62 | | 0.16% |
| Cannabinol | CBN | 2.61 | 720 | 0.26% |
| Cannabigerol | CBG | 2.61 | | 0.26% |
| Cannabichromene | CBC | 0.90 | | 0.09% |
| Delta 8 Tetrahydrocannabinol | D8 THC | <MDL | | <MDL |

715 → (table above); 702 → cannabinoid rows; 718 → concentration bracket; 720 → percent by mass bracket

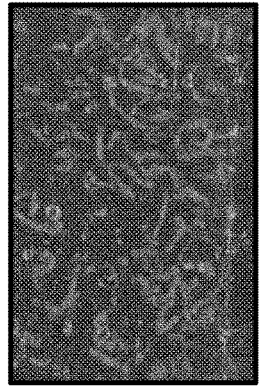

Total Cannabinoids: 22.6%

| PERCENT by MASS | | | | | |
|---|---|---|---|---|---|
| D9 THC: | 21.83% | CBG: | 0.26% | | |
| CBD: | 0.16% | CBC: | 0.09% | | |
| CBN: | 0.26% | D8 THC: | <MDL | | |

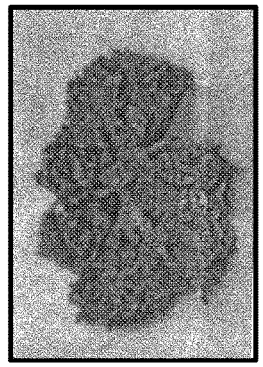

FIG. 7C

METHODS AND COMPOSITIONS FOR INCREASING THE YIELD OF, AND BENEFICIAL CHEMICAL COMPOSITION OF, CERTAIN PLANTS

CROSS-REFERENCE

The present application relies on, for priority, U.S. Patent Provisional Application No. 62/383,091, entitled "Methods and Compositions for Increasing the Bioactivity of Nutrients", and filed on Sep. 2, 2016.

The present specification is also a continuation-in-part of U.S. patent application Ser. No. 14/731,036, of the same title and filed on Jun. 4, 2015, which in turn, relies on U.S. Patent Provisional Application No. 62/009,024, filed on Jun. 6, 2014 and entitled "Methods and Compositions for Increasing the Bioactivity of Nutrients" and U.S. Patent Provisional Application No. 62/144,177, filed on Apr. 7, 2015 and entitled "Methods and Compositions for Increasing the Bioactivity of Nutrients".

The above-mentioned applications are herein incorporated by reference.

FIELD

The present specification is directed toward methods and compositions for increasing the bioactivity of nutrients and, more specifically, for increasing the bioactivity of nutrients through the application of photo-acoustic resonance to increase the yield of agricultural products, specifically, *cannabis*.

BACKGROUND

Plant nutrients, which come primarily from chemical fertilizers, manure, and in some cases sewage sludge, are essential for crop production. When applied in proper quantities and at appropriate times, nutrients (especially nitrogen, phosphorus, and potassium) help achieve optimum crop yields. The profit potential for farmers depends on producing enough crops per hectare to keep production costs below the selling price. Efficient application of the correct types and amounts of fertilizers for the supply of the nutrients is an important part of achieving profitable yields. Further, to meet the continuously increasing demand for food commodities, it is important to increase the nutrient density of nutrients applied to agricultural crops and develop methods for plants to absorb these nutrients more efficiently, thereby helping farmers increase their crop output.

Nutrient density can be defined as the quantity of a nutrient per unit of weight of produce or sap. It is generally expressed in terms of grams/100 grams, as a percentage of weight of the given nutritional component in total weight for high quantity substances as in sucrose.

The sugar available to the plants from an applied nutrient solution may be measured in degrees Brix (° Bx), which is defined as the sugar content of an aqueous solution. One degree Brix is 1 gram of sucrose in 100 grams of solution and represents the strength of the solution as percentage by weight (% w/w). The Brix degree can also be expressed as parts per million by weight in components present in relative trace amounts.

It is known that for every one point increase in the Brix degree, a series of beneficial results, related to greater nutrient transport, occur, including, but not limited to, enhanced transport of nutrients into the cellular substance of the plant, increased sugar and protein content of the food, higher nutrient density for a given application of nutrients, greater resistance to pests and pathological microbes (on the order of 50% or greater improvement in resistance relative to crops treated with unactivated nutrients), and significantly higher yields of produce per plant per hectare cultivated.

One exemplary crop that would benefit from increased nutrient density is *cannabis*. *Cannabis* comprises numerous different compositions which deliver varied therapeutic and medicinal benefits, including, but not limited to, cannabinoids, terpenoids/terpenes, nitrogenous compounds, amino acids, proteins, enzymes, glycoproteins, sugars, hydrocarbons, fatty acids, simple esters and lactones, steroids, non-cannabinoid phenols, flavonoids, and vitamins. It would be beneficial if the concentration and/or yield of one or more of those individual compounds within a *cannabis* crop can be increased through an improved nutrient solution.

Accordingly, there is a need for improving large scale agricultural food production and the nutrient density of crops. There is also a need to enhance the transport of nutrients in an organism in order to increase the food item's Brix degree or other nutrient values. Accordingly, there is a need for methods and compositions to enhance the transport of nutrients, increase the Brix degree, increase the concentration and/or yield of individual compositions within a crop, and/or reliably achieve the above listed biological effects for a wide variety of nutrients and food items.

SUMMARY

The present specification discloses a method of growing *cannabis* comprising: applying an activated composition to an untreated *cannabis* crop, wherein said activated composition comprises an amount of photoacoustic energy deposited therein in a range of 0.05 to 5 milliwatt-minutes per liter; and wherein, after said application, the treated *cannabis* crop exhibits an increased yield in a range of 5% to 50% relative to the untreated *cannabis* crop.

Optionally, the method further comprises: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

The treated *cannabis* crop may exhibit an increase in concentration of at least one of cannabinoids, nitrogenous compounds, amino acids, proteins, enzymes, glycoproteins, sugars, hydrocarbons, alcohols, aldehydes, ketones, acids, fatty acids, esters, lactones, steroids, terpenoids, non-cannabinoid phenols, flavonoids, vitamins, pigments and elements relative to the untreated *cannabis* crop.

The treated *cannabis* crop may have an increased Brix degree in a range of 5% to 75% relative to the untreated *cannabis* crop.

The present specification also discloses a method of growing *cannabis* comprising: applying an activated composition to an untreated *cannabis* crop, wherein said activated composition comprises an amount of photoacoustic energy deposited therein in a range of 0.05 to 5 milliwatt-minutes per liter; and wherein, after said application, at least one of a plurality of cannabinoids constituents of said treated *cannabis* crop has an increased amount in a range of greater than 5% relative to the untreated *cannabis* crop.

Optionally, the method further comprises: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

Optionally, said plurality of cannabinoids constituents comprise at least one of cannabigerolic acid, cannabigerol, cannabichromene, cannabidiolic acid, cannabidiol, and cannabinol.

The treated *cannabis* crop may have an increased Brix degree in a range of greater than 5% relative to the untreated *cannabis* crop.

The present specification also discloses a method of growing *cannabis* comprising: applying an activated composition to an untreated *cannabis* crop, wherein said activated composition comprises an amount of photoacoustic energy deposited therein in a range of 0.05 to 5 milliwatt-minutes per liter; and wherein, after said application, at least one of a plurality of terpene constituents of said treated *cannabis* crop is increased by an amount in a range of greater than 5% relative to the untreated *cannabis* crop.

Optionally, the method further comprises: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

Optionally, said plurality of terpene constituents comprise at least one of alpha-pinene, myrcene, carene, beta-pinene, limonene, alpha-humulene, linalool, terpinolene, bisabolol, caryophyllene, and humulene.

A concentration of total terpene constituents in said treated *cannabis* crop may increase by at least 5% relative to the untreated *cannabis* crop.

The treated *cannabis* crop may have an increased Brix degree in a range of at least 5% relative to the untreated *cannabis* crop.

The present specification also discloses a treated *cannabis* crop prepared by applying an activated composition to an untreated *cannabis* crop, wherein, after said application, the treated *cannabis* crop exhibits an increased yield in a range of 5% to 50% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

The treated *cannabis* may exhibit an increase in concentration of at least one of cannabinoids, nitrogenous compounds, amino acids, proteins, enzymes, glycoproteins, sugars, hydrocarbons, alcohols, aldehydes, ketones, acids, fatty acids, esters, lactones, steroids, terpenoids, non-cannabinoid phenols, flavonoids, vitamins, pigments and elements relative to the untreated *cannabis* crop.

The treated *cannabis* crop may have an increased Brix degree in a range of 5% to 75% relative to the untreated *cannabis* crop.

The present specification also discloses a treated *cannabis* crop prepared by applying an activated composition to an untreated *cannabis* crop, wherein, after said application, at least one of a plurality of cannabinoids constituents of said treated *cannabis* crop has an increased amount in a range of greater than 5% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

Optionally, said plurality of cannabinoids constituents comprises at least one of cannabigerolic acid, cannabigerol, cannabichromene, cannabidiolic acid, cannabidiol, and cannabinol.

The treated *cannabis* crop may have an increased Brix degree in a range of greater than 5% relative to the untreated *cannabis* crop.

The present specification also discloses a treated *cannabis* crop prepared by applying an activated composition to an untreated *cannabis* crop, wherein, after said application, at least one of a plurality of terpene constituents of said treated *cannabis* crop is increased by an amount in a range of greater than 5% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water, a dry nutrient mix, or a liquid nutrient solution.

Optionally, said plurality of terpene constituents comprises at least one of alpha-pinene, myrcene, carene, beta-pinene, limonene, alpha-humulene, linalool, terpinolene, bisabolol, caryophyllene, and humulene.

A concentration of total terpene constituents in said treated *cannabis* crop may increase by at least 5% relative to the untreated *cannabis* crop.

The treated *cannabis* crop may have an increased Brix degree in a range of at least 5% relative to the untreated *cannabis* crop.

The present specification is also directed toward increasing the Brix degree of crops through the application of photoacoustic resonance to a nutrient formulation, forming an activated nutrient formulation.

In one embodiment, an increase of at least 10% in the Brix degree of the crop, relative to an unactivated nutrient formulation, can be achieved by treating the crop with an a laser activated nutrient solution. In addition, an increase of at least 10%, relative to an unactivated nutrient formulation, is seen with respect to nutrient density and crop yield through application of the activated nutrient solution.

In an embodiment, the present specification discloses a treated *cannabis* crop prepared by applying an activated composition to an untreated *cannabis* crop, wherein, after said application, the treated *cannabis* crop exhibits an increased yield in a range of 5% to 50% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water.

Optionally, said unactivated composition is a dry nutrient mix.

Optionally, said unactivated composition is a liquid nutrient solution.

Optionally, said treated *cannabis* crop exhibits an increase in concentration of at least one of cannabinoids, nitrogenous compounds, amino acids, proteins, enzymes, glycoproteins, sugars, hydrocarbons, alcohols, aldehydes, ketones, acids, fatty acids, esters, lactones, steroids, terpenoids, non-cannabinoid phenols, flavonoids, vitamins, pigments and elements relative to the untreated *cannabis* crop.

Optionally, said treated *cannabis* crop has an increased Brix degree in a range of 5% to 75% relative to the untreated *cannabis* crop.

In some embodiments, the present specification discloses a treated *cannabis* crop prepared by applying an activated composition to an untreated *cannabis* crop, wherein, after said application, at least one of a plurality of cannabinoids constituents of said treated *cannabis* crop has an increased amount in a range of greater than 5% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water.

Optionally, said unactivated composition is a dry nutrient mix.

Optionally, said unactivated composition is a liquid nutrient solution.

Optionally, said plurality of cannabinoids constituents comprise at least one of cannabigerolic acid, cannabigerol, cannabichromene, cannabidiolic acid, cannabidiol, and cannabinol.

Optionally, said treated *cannabis* crop has an increased Brix degree in a range of greater than 5% relative to the untreated *cannabis* crop.

In some embodiments, the present specification discloses a treated *cannabis* crop prepared by applying an activated composition to an untreated *cannabis* crop, wherein, after said application, at least one of a plurality of terpene constituents of said treated *cannabis* crop is increased by an amount in a range of greater than 5% relative to the untreated *cannabis* crop, and wherein said activated composition is prepared by a process comprising: forming an unactivated composition; and applying to said unactivated composition a plurality of ultra-rapid impulses of modulated laser light, said ultra-rapid impulses being defined as impulses with molecular traverse rates on the order of 100 nanoseconds to 0.01 femtoseconds.

Optionally, said unactivated composition is water.

Optionally, said unactivated composition is a dry nutrient mix.

Optionally, said unactivated composition is a liquid nutrient solution.

Optionally, said plurality of terpene constituents comprises at least one of alpha-pinene, myrcene, carene, beta-pinene, limonene, alpha-humulene, linalool, terpinolene, bisabolol, caryophyllene, and humulene.

Optionally, a concentration of total terpene constituents in said treated *cannabis* crop increases by at least 5% relative to the untreated *cannabis* crop.

Optionally, said treated *cannabis* crop has an increased Brix degree in a range of at least 5% relative to the untreated *cannabis* crop.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein:

FIG. 1A is a diagram illustrating an optical system for the modulation of a laser beam, in accordance with one embodiment of the present specification;

FIG. 1B is an illustration of an interference pattern produced by the system of FIG. 1;

FIG. 4 is a table illustrating a plurality of chemical classes of constituents in *cannabis* and number of known constituents in each chemical class;

FIG. 7C illustrates a table of the plurality of cannabinoids and their respective concentrations for *cannabis* flowers for a second group of test plants, treated with laser-activated water;

DETAILED DESCRIPTION

Figure 2:
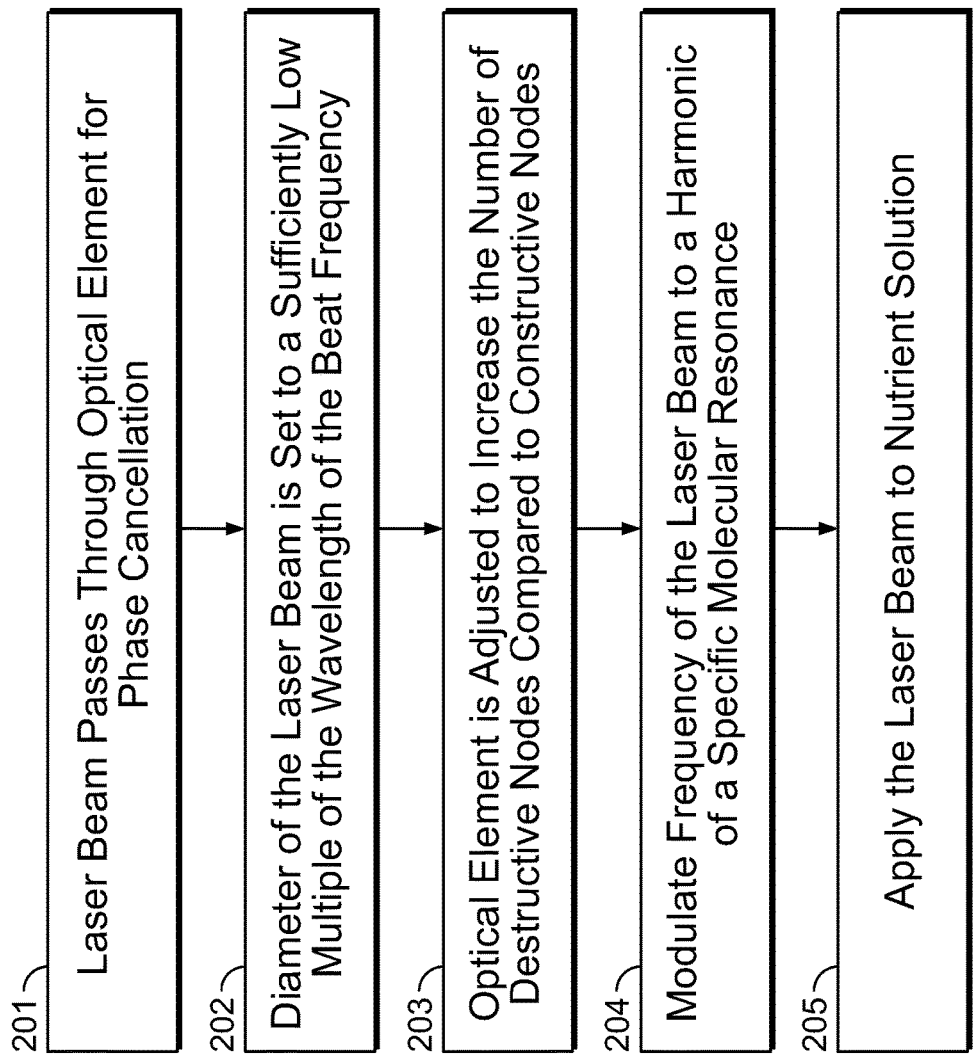
FIG. 2 is a flowchart describing a method of photoacoustic stimulation of a nutrient solution, in accordance with one embodiment of the present specification.

In one embodiment, the present specification discloses a method of increasing the nutrient density and Brix value derived from applying activated nutrient formulations or solutions to *cannabis*, thus increasing the potency and efficacy of the nutrients supplied to the plants, which in turn improves the yield and quality of the overall *cannabis* crop as well as the individual therapeutic and medicinal compositions, such as the constituent cannabinoids, terpenoids/terpenes, nitrogenous compounds, amino acids, proteins, enzymes, glycoproteins, sugars, hydrocarbons, fatty acids, simple esters and lactones, steroids, non-cannabinoid phenols, flavonoids, and vitamins. In an embodiment, photoacoustic stimulation is applied to a nutrient formulation to create an activated nutrient formulation which results in improved nutrient density in the *cannabis* crop when compared with an application of the unactivated nutrient formulation. In another embodiment, photoacoustic stimulation is applied to water to create an activated water formulation ("lasered water") which results in improved nutrient density in the *cannabis* crop when compared with an application of untreated water.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

It should be noted herein that any feature or component described in association with a specific embodiment may be used and implemented with any other embodiment unless clearly indicated otherwise.

In the description and claims of the application, each of the words "comprise" "include" and "have", and forms thereof, are not necessarily limited to members in a list with which the words may be associated.

Molecular resonance generated by laser radiation can be used for direct stimulation of natural biological processes as described in U.S. Pat. No. 6,811,564, which is incorporated herein by reference in its entirety.

FIG. 1A is a diagram illustrating an optical system for the modulation of a laser beam, in accordance with one embodiment of the present specification. Referring to FIG. 1A, the apparatus comprises a laser diode 102 which is controlled by an amplitude modulator 101. The laser diode 102 is selected such that it has a substantially linear relationship between current and wavelength with minimum mode hopping. The amplitude modulator 101 modulates the current directed to the laser diode which in turn results in a very small wavelength modulation of the laser.

The output of the laser diode 102 is collimated by a lens 103 and propagated towards an optical element 104. In one embodiment, the optical element 104 consists of a first diffraction grating, a refractive element, and a second diffraction grating such that the beam is substantially cancelled. An exemplary form of an optical element is disclosed in U.S. Pat. No. 6,064,500, which is incorporated herein by reference in its entirety. This allows the cancellation to occur over a small percentage of the wavelength variance of the laser source, rather than at a single critical wavelength. Wavelengths beyond the acceptance bandwidth of the cancelling optical element 104 above and below the center frequency pass without being cancelled. This means that a complex Fresnel/Fraunhoffer zone will be generated, defined by the beat frequency of the high and low frequencies as a function of the aperture. Therefore, relatively sparse zones of constructive interference will occur between the high and low frequency passes of the cancellation element in selected directions from the aperture, as shown by the interference pattern 150 in FIG. 1B.

As seen in FIG. 1A, the optical element can be adjusted angularly between positions 104A and 104B. In an embodiment, the output of the laser diode is normal to the plane of the optical element 104A. This varies the ratio of constructive to destructive interference. In effect, the continuous beam is transformed into a string of extremely short duration pulses typically of sub-femtosecond duration. A nanosecond is a billionth of a second, and a femtosecond is a billionth of a nanosecond. The small wavelength modulation of the laser diode 102 causes the constructive and destructive nodes to move rapidly through the volume of the Fresnel zone of the collimator lens aperture. This has the effect of simulating very short (sub-picosecond) pulse behavior at any point in the Fresnel zone through which the nodes pass at a pulse repetition frequency defined by the amplitude modulator frequency.

If the beat frequency is made high enough, the wavelength of the cancelled to non-cancelled cycle can be a fraction of a practical aperture. This will cause the wavelength to be sufficiently small, thus limiting the Feynman paths to within a cycle or two in free space allowing the Fresnel/Fraunhoffer effect to be apparent. Since the center frequency and spectrum spread of a laser diode is easily modulated by adjusting the current and/or temperature of the junction, the pattern of the Fresnel/Fraunhoffer zones can be varied dramatically by very small variations in the wavelength of one or both pass frequencies. Such modulation is produced in the apparatus of FIG. 1A by the amplitude modulator 101.

In effect, to the degree to which the optical device is adjusted to increase the destructive interference, the nodes become commensurately sparser, the measurable light output decreases, and the depth of penetration of the nodes through a medium increases.

As mentioned above, the effective pulse repetition frequency of such nodes can reach impulse rates as fast as sub-femtoseconds. As molecular bond rotations and vibrations occur at rates on the order of 10 femtoseconds, the output of this device can meet or exceed such rates and entrain resonance of molecular bond vibrations. As demonstrated by Ovokaitys and Strachan in U.S. Pat. No. 8,377,989, also incorporated herein by reference in its entirety, this type of stimulation can build the free energy of chemical bonds in a system in which high free energy states of matter, such as room temperature stable non-crystalline aspirin, become possible. It is believed that an alternating sequence of ultra-short laser pulses provides photons that interact with multiple electronic and/or vibrational states of the aspirin, disrupting intermolecular interactions, and, thus, preventing crystal formation and/or disrupting the crystal structure. The resultant non-crystalline structure has a higher free energy in the intermolecular lattice than any crystallized form or structure. This higher energy state was also reported by Johari et al. in *Physical Chemistry Chemical Physics*, 2000, 2, 5479-5484, wherein a vitreous state of aspirin had a higher energy state than the crystal state. This imparts a higher solubility in water to the non-crystalline form that can be about 2 to 8 times higher than that of the crystal form for similarly sized particles. Referring to U.S. Pat. No. 8,377,989, laser stimulation results in a stable increase in the free energy in the compound demonstrable through Fourier-transform infrared spectroscopy (FTIR) and powder X-ray diffraction (PXRD). The stable increase in free energy can also be shown in the preparation of non-crystalline forms of statins, including ezetimibe. This change in structure, or heightened state, is defined in thermodynamics as the known increase in free energy between a crystalline and a glass or non-crystalline compound, which translates to faster solubility and greater bioavailability.

In addition, as demonstrated by Ovokaitys and Strachan in U.S. Pat. No. 8,404,733, also incorporated herein by reference in its entirety, laser stimulation can build the free energy of chemical bonds in a system to create a blend of laser treated amino acid powders useful in regenerating active myocardial tissue. It is believed that short pulses of laser light provide photons that interact with multiple electronic and/or vibrational states of the composition to provide the laser modified blend of amino acid powders.

United States Patent Application Number 2004/0204746A1, also incorporated herein by reference in its entirety, discloses a method for improving the bioavailability of a bioactive substance by subjecting the bioactive substance to laser radiation. Application of laser light processes alters the bond structures of and shape of molecules in subjected compounds and thus alters the reaction characteristics such that certain preferred biological reactions can be enhanced.

In one embodiment, modulated laser stimulation is applied to dry nutrient mixes, liquid nutrient formulations, or water. In one embodiment, photoacoustic laser stimulation is applied to dry nutrient mixes, liquid nutrient formulations, or water. Preferably, the modulated laser stimulation is a modulated impulse stimulation, as described above, which, when applied to nutrient and nutrient formulations, is found to have a profound effect on increasing the potency and efficacy of the nutrients. An impulse is a construct of the fluctuating traverse of sparse nodes as an interference pattern produced by relationships between holograms and the rapid and slight movement of center point of laser wavelength, rather than simply in a fixed pulse produced from, for example, an LRC circuit or other pulse wave form generator. In a sense, the impulse is a construct of interference fringe phenomena and beat frequencies, rather than a precisely defined pulse. In one embodiment, the impulse stimulation is ultra-rapid. For purposes of this specification, ultra-rapid impulses are defined as impulses with molecular traverse rates ranging from 100 nanoseconds to 0.01 femtoseconds. A molecular traverse rate can be defined as the time it takes for the impulse to go from one end to the other end of a molecule. Accordingly, an impulse may be viewed as an ultra-rapidly modulated beam with a high pulse repetition frequency. Notwithstanding the above, it should be appreciated that the compositions and methods disclosed herein are not limited to the use of impulse stimulation or ultra-rapid impulse stimulation and may be implemented using less than ultra-rapid impulse stimulation or other forms of modulation laser stimulation.

FIG. 2 is a flowchart listing the steps involved in a method of photoacoustic stimulation of a nutrient or nutrient formulation, in accordance with one embodiment of the present specification to form an activated nutrient or nutrient formulation. Referring to FIG. 2, in step 201, a collimated or near collimated laser beam from a laser diode is passed through a phase cancellation optical element. The optical element cancels several of the central lines of the laser frequency while leaving the higher and lower frequencies generally intact, such that the beat frequency of the passed frequencies forms a pattern of interference of constructive and destructive nodes. In step 202, the diameter of the laser beam is set to a sufficiently low multiple of the wavelength of the beat frequency to allow a substantial Fresnel zone to be apparent in the beam. Thereafter, in step 203, the optical element is adjusted to obtain the desired ratio of constructive to destructive interference. In one embodiment, the optical element is adjusted such that the number of destructive nodes is in substantial majority relative to the constructive nodes. The constructive interference only occurs over ultra-short time periods, and, thus, results in ultra-short pulses of light. These small, directed bursts of light are modulated at the frequency of the desired molecule, as shown in step 204, resulting in the desired molecular resonance effect.

Figure 3A:
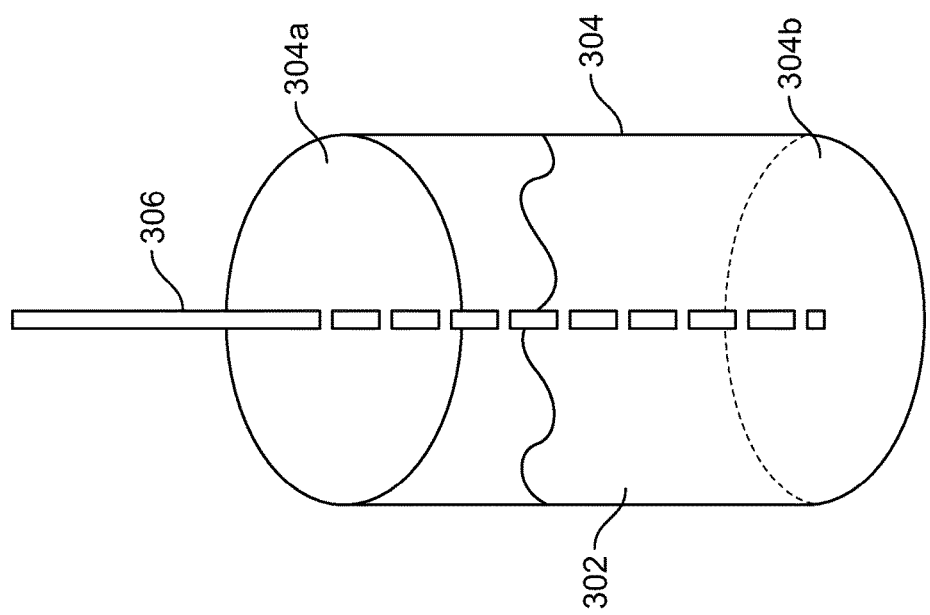
FIG. 3A is a diagram showing one method for applying a modulated laser beam to a nutrient solution.
Figure 3B:
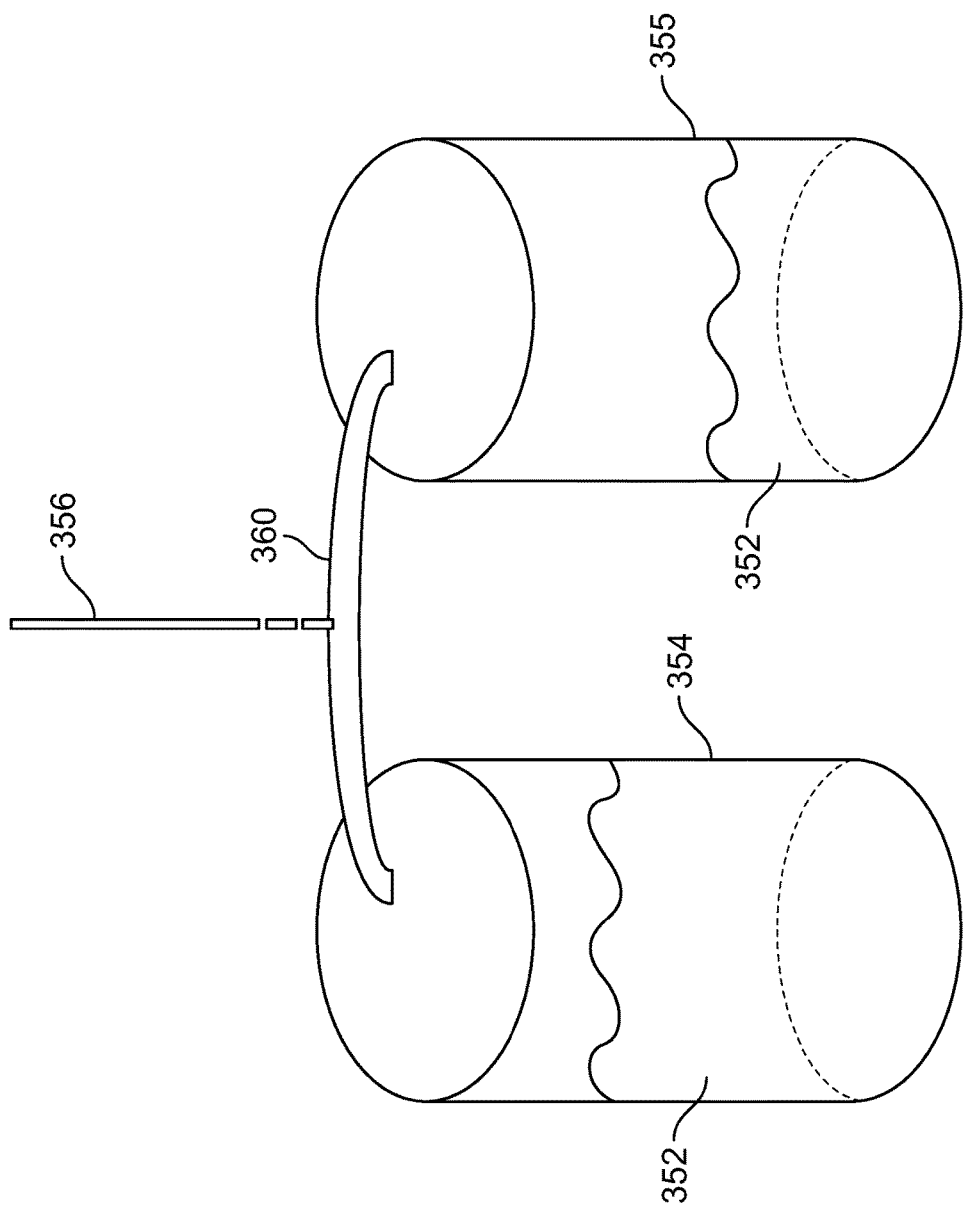
FIG. 3B is a diagram showing another method for applying a modulated laser beam to a nutrient solution.

The modulated laser beam is then applied to a desired nutrient solution in step 205. In one embodiment, as shown in FIG. 3A, a quantity of nutrient solution 302 is housed in a container 304. At least one laser emits a beam 306 that is configured to be applied to the nutrient solution 302 at a trajectory that allows a full traverse of the beam 306 from and/or through a first surface 304a of the container to an opposing surface 304b of the container.

In another embodiment, a quantity of nutrient solution 352 is housed in a first container 354 and transported to a second container 355 via a conduit 360, which is in fluid communication with both first container 354 and second container 355. At least one laser emits a beam 356 that is configured to be applied to the nutrient solution 352 at a trajectory that allows a full traverse of the beam 356 through the conduit 360 such that the nutrient solution is activated as it passes through the conduit 360. While the laser is shown to interact with the container or conduit vertically, it should be appreciated that the laser can interact in any direction provided the trajectory allows a full traverse of the beam through the nutrient solution.

In one embodiment, photoacoustic stimulation or resonance (PAR), as described above, is applied to a nutrient solution to create an activated nutrient solution. In an embodiment, photoacoustic stimulation is applied to a wet nutrient solution, formulation or fertilizer. In another embodiment, photoacoustic stimulation is applied to a dry nutrient formula. In another embodiment, photoacoustic stimulation is applied to water without any added fertilizers or other nutrients. In another embodiment, photoacoustic stimulation is applied to individual nutrients which may be combined to create a dry or liquid nutrient solution or formulation.

In various embodiments, each laser has a wavelength in a range of 400 to 750 nanometers. Each system was adjusted to 60% phase cancellation so the measured power output of the systems after this adjustment was in the range of 0.7 to 2.2 milliwatts, with an average of 1.2 milliwatts per system.

In various embodiments, application of photoacoustic energy, via a laser beam as described in the present specification, to a nutrient solution results in a structural change to the nutrient solution, such that a nutrient solution subjected to said laser beam has a different structure when compared to the same nutrient solution prior to being subjected to said laser beam. In other words, the structure of the nutrient solution is modified by said laser beam or photoacoustic energy. The structure of the nutrient solution is changed or modified in that photoacoustic energy is added or deposited to said nutrient solution. The application and deposition of photoacoustic energy builds or increases the free energy of chemical bonds within the nutrient solution. Similar to the discussion above with respect to crystalline and glass or non-crystalline forms of solids, such as aspirin, in a solution, an energy difference (stable increase in free energy) in created when the solution is subjected to laser stimulation. It is believed that a nutrient solution transitions to a heightened free energy state when ultra-short laser pulses provides photons that interact with the intermolecular bonds within the nutrient solution. For example, photoacoustic energy, when subjected to a solution comprising water, is transmitted to the hydrogen bonds in the water, depositing energy in the bonds and creating a different structure. When subjected to photoacoustic energy via said laser beam, the molecules in the nutrient solution are transitioned to a higher energy state without breaking the molecular bonds or otherwise denaturing or degrading the nutrients. Therefore, the nutrient solution structure has changed in that it has a higher level of deposited photoacoustic energy than before application of the laser beam.

In various embodiments, when the disclosed beams of light are passed through a bioactive substance, resonance causes modifications in the molecular structure of the molecules of the substance. This may be the folding of the molecule, the promotion or inhibition of a certain "handedness" of a stereoisomeric molecule, or simply a modification in the molecular dimensions of the molecule. By selectively controlling the molecules, however, significant changes can be made in bioavailability, and/or physiologic reaction to the molecule.

In an alternative embodiment, after the disclosed beams of light are passed through a bioactive substance, molecules of the substance have an increased energy state or energy level. Chemical bonds between atoms in a molecule form because the bonds make the situation more stable for the involved atoms, which generally means the sum energy level for the involved atoms in the molecule is lower than if the atoms were not so bonded. As separate atoms approach each other to covalently bond, their orbitals affect each other's energy levels to form bonding and antibonding molecular orbitals. The energy level of the bonding orbitals is lower, and the energy level of the antibonding orbitals is higher. For the bond in the molecule to be stable, the covalent bonding electrons occupy the lower energy bonding orbital. A molecular energy state is the sum of its electronic, vibrational, rotational, nuclear, and translational components. Electrons in atoms and molecules can change, or make transitions in, energy levels by emitting or absorbing a photon of electromagnetic radiation, whose energy must be exactly equal to the energy difference between the two levels. If a molecule is at the lowest possible energy level, it and its electrons are said to be in the ground state. If it is at a higher energy level, it is said to be excited. Such a species can be excited to a higher energy level by absorbing a photon whose energy is equal to the energy difference between the levels. Therefore, in various embodiments, molecules in a nutrient solution or substance can transition to a higher energy level or state by absorbing photons from beams of light as described in the present specification. Conversely, an excited species can go to a lower energy level by spontaneously emitting a photon equal to the energy difference. Alternatively, such molecular modifications do not necessarily result in the degradation of the molecule, breaking of atomic bonds within the molecule, or ionization of the molecule.

In various embodiments, the difference in structure is defined by the applied energy in total millijoules per liter, which can be calculated by 1 milliwatt (1 millijoule/sec)× number of second=number of millijoules. In various embodiments, after application of a laser beam in accordance with the present specification, a nutrient formulation comprises a composition having an amount of photoacoustic energy deposited therein which is greater than the amount of photoacoustic energy therein prior to application of the laser beam. In various embodiments, after application of a laser beam in accordance with the present specification, a nutrient formulation comprises a composition having an amount of photoacoustic energy deposited therein in a range of 0.05 to 5 milliwatt-minutes per liter. In one embodiment, after application of a laser beam in accordance with the present specification, a nutrient formulation comprises a composition having an amount of photoacoustic energy deposited therein in a range of 0.05 to 1.25 milliwatt-minutes per liter. In some embodiments, an amount of photoacoustic energy within a nutrient formulation before application of a laser beam is in a range of 0-0.05 milliwatt-minutes per liter.

In an embodiment, a wet nutrient solution, formulation or fertilizer comprises, individually or in combination, water ($H_2O$) and one or more of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), chromium (Cr) and zinc (Zn).

In an embodiment, a dry nutrient formulation or fertilizer comprises, individually or in combination, one or more of nitrogen (N), phosphorus (P), potassium (K), sulfur (S), calcium (Ca), magnesium (Mg), boron (B), chlorine (Cl), copper (Cu), iron (Fe), manganese (Mn), molybdenum (Mo), cobalt (Co), nickel (Ni), iodine (I), selenium (Se), chromium (Cr) and zinc (Zn).

In an embodiment, the nutrient solution, formulation or fertilizer comprises just water ($H_2O$) without any added nutrients or fertilizers. It should be appreciated that the term "water" refers to any natural or treated water supply that may be commonly used to water crops.

The nutrient solution, formulation or fertilizer—in dry or wet form, in some embodiments, comprises compounds such as urea, ammonium phosphate, ammonium nitrate, ammonium sulfate, potash and gypsum, individually or in combination with other compounds and elements.

In some embodiments, some or all of the components of the nutrient solution are sourced from at least one of the following ingredients: kelp, dry fish, sea bird guano, fulvic acids, and/or free iodine. It should be appreciated that one of ordinary skill in the art could obtain any of the aforementioned nutrient elements or compounds from any source and that the present inventions are not limited to particular sources of nutrients.

In one embodiment, when an activated liquid nutrient solution, an activated dry nutrient mix, or activated water is applied to agricultural crops, specifically *cannabis*, several benefits occur. First, *cannabis* crop yields increase in a range of 5% to 50%, including any increment therein, relative to *cannabis* crops treated with the same, but unactivated, liquid nutrient solution, dry nutrient mix, or water. Second, *cannabis* crops experience an increase in Brix degree in a range of 5% to 50%, including any increment therein, relative to *cannabis* crops treated with the same, but unactivated, liquid nutrient solution, dry nutrient mix, or water. Third, individual constituents within *cannabis*, such as cannabinoids, terpenoids/terpenes, nitrogenous compounds, amino acids, proteins, enzymes, glycoproteins, sugars, hydrocarbons, fatty acids, simple esters and lactones, steroids, non-cannabinoid phenols, flavonoids, and vitamins, increase in concentration or mass in a range of 1% or greater, including any increment therein, relative to *cannabis* crops treated with the same, but unactivated, liquid nutrient solution, dry nutrient mix, or water.

In some embodiments, when an activated liquid nutrient solution, activated dry nutrient mix, or activated water is applied to *cannabis*, within one hour of said application, the treated *cannabis* product exhibits an increased Brix degree in a range of 5% to 50% relative to crops treated with the same, but unactivated liquid nutrient solution, dry nutrient mix, or water within one hour of said application.

For the purposes of this specification, a growing season can be defined as when a crop is harvested, after a growing period initiating with the planting of a seed, where the growing period can be from 2-3 weeks for fast growing crops, such as for radish, lettuce, broccoli, spinach, onion, carrot green peas, cucumber, pepper and tomatoes, to ten months or more for slower growing crops, such as wheat. The first stage growing period for a *cannabis* crop is typically in the range of 30 to 60 days, which is determined by the rate of growth and can span up to 150 days for slower growing crops. A typical flowering period, which is the second stage of growth, ranges from 40 to 75 days. The harvesting period conventionally includes a drying period of one week in a drying room with circulating air, followed by a second drying period of 2 to 4 weeks in plastic film bags.

The *cannabis* plant and its products consist of a plurality of chemicals or constituents some of which are unique to *cannabis*, for example, the 70 cannabinoids, and the terpenoids, with about 140 members forming the most abundant class. Table 1 of FIG. 4, illustrates a plurality of known or identified constituents of *cannabis* by chemical class 405 along with a number of known constituents 410 within each chemical class 405 (or subclass). It should be appreciated that each of these constituents increase in concentration or mass in a range of 1% or greater, including any increment therein, relative to *cannabis* crops treated with the same, but unactivated, liquid nutrient solution, dry nutrient mix, or water. These chemical or constituent classes 405 and the constituents or chemicals 410 therein are described as follows:

Cannabinoids

This class includes, but is not limited to, more than 70 known cannabinoids sub-classified as a) cannabigerol (CBG) type including cannabigerolic acid, cannabigerolic acid monomethyl ether, cannabigerol, cannabigerol monomethyl ether, cannabigerovarinic acid, cannabigerovarin, cannabinerolic acid; b) cannabichromene (CBC) type including cannabichromenic acid, cannabichromene, cannabichromevarinic acid, cannabivarichromene, cannabichromevarin, 2-Methyl-2-(4-methyl-2-pentenyl)-7-propyl-2H-1-benzopyran-5-ol; c) cannabidiol (CBD) type including cannabidiolic acid, cannabidiol, cannabidiol monomethyl ether, cannabidiol-C4, cannabidivarinic acid, cannabidivarin, cannabidiorcol; d) Delta-9-tetrahydrocannabinol type including delta-9-tetrahydrocannabinolic acid A, delta-9-tetrahydrocannabinolic acid B, delta-9-tetrahydrocannabinol, delta-9-tetrahydrocannabinolic acid-C4, delta-9-tetrahydrocannabinol-C4, delta-9-tetrahydrocannabivarinic acid, delta-9-tetrahydrocannabivarin, delta-9-tetrahydrocannabiorcolic acid, delta-9-tetrahydrocannabiorcol, delta-7-cis-iso-tetrahydrocannabivarin; e) delta-8-tetrahydrocannabinol type including delta-8-tetrahydrocannabinolic acid A, delta-8-tetrahydrocannabinol; f) cannabicyclol (CBL) type including cannabicyclolic acid, cannabicyclol, cannabicyclovarin; g) cannabielsoin (CBE) type including cannabielsoic acid A, cannabielsoic acid B, C3-cannabielsoic acid B, cannabielsoin, C3-cannabielsoin; h) cannabinol (CBN) type including cannabinolic acid A, cannabinol, cannabinol methyl ether, cannabinol-C4, cannabivarin, cannabinol-C2, cannabiorcol-C1; i) cannabinodiol (CBND) type including cannabinodiol, cannabinodivarin; j) cannabitriol (CBT) type including (−)-trans-cannabitriol, (+)-trans-cannabitriol, (±)-cis-cannabitriol, (±)-trans-cannabitriol-C3, CBT-C3-homologue, (−)-trans-10-Ethoxy-9-hydroxy-Delta 6a(10a)-tetrahydrocannabinol, trans-10-Ethoxy-9-hydroxy-Delta 6a(10a)-tetrahydrocannabivarin-C3, 8,9-Dihydroxy-Delta 6a(10a)-tetrahydrocannabinol, cannabidiolic acid tetrahydrocannabitriol ester; k) miscellaneous type including dehydrocannabifuran, cannabifuran, cannabichromanone, cannabichromanone-C3, cannabicoumaronone-C5, cannabicitran, 10-Oxo-Delta 6a(10a)-Tetrahydrocannabinol, (−)-Delta-9-(6aS,10aR-cis)-Tetrahydrocannabinol, cannabiglendol-C3, (−)-(6aR,9S,10S,10aR)-9,10-Dihydroxyhexahydrocannabinol, (−)-6a,7,10a-Trihydroxy-Delta-9-tetrahydrocannabinol, (±)-Delta-7-cis-(1R,3R,6S)-Isotetrahydrocannabivarin-C3, (−)-Delta-7-trans-(1R,3R,6R)-Isotetrahydrocannabivarin-C3, (−)-Delta-7-trans-(1R,3R,6R)-Isotetrahydrocannabinol-C5. 11 additional cannabinoid esters include β-fenchyl Delta-9-tetrahydrocannabinolate, epi-bornyl Delta-9-tetrahydrocannabinolate, α-terpenyl Delta-9-tetrahydrocannabinolate, 4-terpenyl Delta-9-tetrahydrocannabinolate, α-cadinyl Delta-9-tetrahydrocannabinolate, γ-eudesmyl Delta-9-tetrahydrocannabinolate, γ-eudesmyl cannabigerolate, 4-terpenyl cannabinolate, bornyl Delta-9-tetrahydrocannabinolate, α-fenchyl Delta-9-tetrahydrocannabinolate, α-cadinyl cannabigerolate.

Cannabinoids, which are secreted by *cannabis* flowers, provide relief for many symptoms, including inflammation, nausea and pain. Cannabinoids mimic compounds, called endocannabinoids, which are naturally produced by the human body and which mediate communication between cells. When the endocannabinoid system is not functioning properly, the human body can experience physical discomfort or unpleasant symptoms.

Cannabinoids bind to receptor sites throughout our brain (CB-1) and body (CB-2), and depending upon which receptors they bind to, can have different effects. THC binds to the brain receptors, while cannabinol has a stronger affinity for the body receptors.

Terpenoids/Terpenes

This class includes, but is not limited to 140 different terpenes belonging to monoterpenoids (C10 skeleton), sesquiterpenoids (C15), diterpenoids (C20), and triterpenoids (C30) groups. Terpenoids may be acyclic, monocyclic, or polycyclic hydrocarbons with substitution patterns including alcohols, ethers, aldehydes, ketones, and esters. Following are some of the terpenoids: mycrene, limonene, linalool, trans-ocimene, beta-pinene, alpha-pinene, beta-caryophyllene, delta-3-carene, trans-gamma-bisabolene, trans-alpha-farnesene, beta-fenchol, beta-phellandrene, alpha-humulene, guajol, alpha-guaiene, alpha-eudesmol, terpinolene, alpha-selinene, alpha-terpineol, fenchone, camphene, cis-sabinene hydrate, cis-ocimene, beta-eudesmol, beta-selinene, alpha-trans-bergamotene, gamma-eudesmol, borneol, cis-beta-farnesene, gamma-curcumene, cis-gamma-bisabolene, alpha-thujene, epi-alpha-bisabolol, ipsdienol, alpha-ylangene, beta-elemene, alpha-cis-bergamotene, gamma-muurolene, alpha-cadinene, alpha-longipinene, caryophyllene oxide.

Terpenes have the ability to act synergistically with cannabinoids as well as other compounds in the plant. Terpenes are thought to bind to the brain's receptors where they affect their chemical output, and, possibly modify how much THC passes through the blood-brain barrier. Terpene may also influence neurotransmitters such as dopamine and serotonin by altering their rate of production, their movement, and the availability of receptor sites. The effects vary among the different terpenes. It should also be noted that CBDs are 21-chain carbon molecules which are difficult for the body to absorb, while terpenes are 6-8 carbon chain molecules and can facilitate the ability of the body to absorb CBDs.

Alpha-pinene and beta-pinene, for example, are used to enhance alertness, memory retention and may even counteract some of the effects of THC. Myrcene is said to have a sedative, relaxing effect and can be used for relieving muscle tension, sleeplessness, pain, inflammation, and depression. Limonene is used to elevate mood and relieve stress, as well as act as an antifungal, anti-bacterial, and anti-carcinogenic. Beta-Caryophyllene is used for its gastroprotective and anti-inflammatory properties. Linalool is said to have anxiolytic and sedative properties.

Nitrogenous Compounds

This class includes, but is not limited to, 5 quaternary bases, 8 amides (N-trans-Feruloyltyramine, N-p-Coumaroyltyramine, N-trans-Caffeoyltyramine) of which 5 are lignanamides (grossamide, cannabisin-A, B, C, D), 12 simple amines, and 2 spermidine type alkaloids named cannabisativine and anhydrocannabisativine.

Amino Acids

This class includes, but is not limited to, at least 18 amino acids common in all plants including *cannabis*. The only amino acids not reported in *cannabis* are cysteine, asparagine, glutamine, hydroxyproline and hydroxylysine.

Proteins, Enzymes and Glycoproteins

This class includes, but is not limited to, 3 proteins (edestin, zeatin and zeatinnucleoside), 6 enzymes (edestinase, glucosidase, polyphenol oxidase, peptidase, peroxidase and adenosine-5-phosphatase) and 2 glycoproteins of unknown structure.

Sugars and Related Compounds

This class includes, but is not limited to, 13 monosaccharides (fructose, galactose, arabinose, glucose, mannose, rhamnose, etc.), 2 disaccharides (sucrose, maltose), 5 polysaccharides (raffinose, cellulose, hemicellulose, pectin, xylan), 12 sugar alcohols and cyclitols (mannitol, sorbitol, glycerol, inositol, quebrachitol, etc.) and 2 amino sugars (galactosamine, glucosamine).

Hydrocarbons

This class includes, but is not limited to, 50 known hydrocarbons consisting primarily straight chain hydrocarbons ranging from C9 to C39 with a few branched hydrocarbons in which one or two methyl groups form substituents along the main chain.

Simple Alcohols, Aldehydes, Ketones and Acids

This class includes, but is not limited to, 7 alcohols (e.g., methanol, ethanol, 1-octene-3-ol), 12 aldehydes (e.g., acetaldehyde, isobutyraldehyde, pentanal), 13 ketones (e.g., acetone, heptanone-2, 2-methyl-2-heptene-6-one), and 21 acids (e.g., arabinic acid, azealic acid, gluconic acid).

Fatty Acids

This class includes, but is not limited to, 33 different fatty acids, mainly unsaturated fatty acids such as linoleic acid, α-linolenic acid, oleic acid, γ-linolenic acid, stearidonic acid, eicosanoic acid, cis-vaccenic acid, and isolinoleic acid. The saturated fatty acids are palmitic acid, stearic acid, arachidic acid, behenic acid, myristic acid, lignoceric acid, caproic acid, heptanoic acid, caprylic acid, pelargonic acid, capric acid, lauric acid, margaric acid, and isoarachidic acid.

Simple Esters and Lactones

This class includes, but is not limited to include 12 esters and 1 lactone. The esters are mainly low molecular weight organic acids, with two methyl esters of the fatty acids palmetic and linoleic. There is one aromatic acid ester (methyl salicylate). The only lactone is 2-C-methyl-aldoteronolactone.

Steroids

This class includes, but is not limited to, 11 phytosterols belonging to the stigmasterol, β-sitosterol, compesterol, and ergosterol types.

Non-cannabinoid Phenols

This class includes, but is not limited to, 34 non-cannabinoid phenols: 9 with spiro-indan-type structure (e.g., cannabispiran, isocannabispiran), 9 dihydrostilbenes (e.g., cannabistilbene-I, II), 3 dihydrophenanthrenes (e.g., cannithrene-1, -2), and 6 phenols, phenol methylethers, and phenolic glycosides (phloroglucinol glucoside).

Flavonoids

This class includes, but is not limited to 23 flavonoids existing mainly as C-/O- and O-glycosides of the flavon- and flavonol-type aglycones apigenin, luteolin, quercetin, and kaempferol along with 2 flavonol glycosides namely kaempferol 3-O-sophoroside and quercetin 3-Osophoroside. Orientin, vitexin, luteolin-7-O-glucoside, and apigenin-7-O-glucoside are the major flavonoid glycosides present in low-THC *Cannabis* cultivars.

Vitamins

This class includes, but is not limited to, Vitamin K.

Pigments

This class includes, but is not limited to 2 pigments: carotene and xanthophylls.

Elements

This class includes, but is not limited to 9 elements: Na, K, Ca, Mg, Fe, Cu, Mn, Zn, Hg.

In some embodiments, when an activated liquid nutrient solution, activated dry nutrient mix, or activated water is applied to *cannabis*, by the end of the growing season, the treated *cannabis* has an increased yield per hectare in a range of 5% to 50% relative to *cannabis* crops treated with the same, but unactivated, liquid nutrient solution, dry nutrient mix, or water.

In some embodiments, when an liquid nutrient solution, activated dry nutrient mix, or activated water is applied to *cannabis*, by the end of a growing season, the treated *cannabis* delivers an enhanced transport of nutrients to its cells and sap in a range of 5% to 400% greater relative to *cannabis* crops treated with the same, but unactivated, liquid nutrient solution, dry nutrient mix, or water.

In some embodiments, when an liquid nutrient solution, activated dry nutrient mix, or activated water is applied to *cannabis*, within one hour after said application, the treated *cannabis* has a 5% to 50% increased amount of at least one of sugar content or protein content relative to *cannabis* crops treated with the same, but unactivated, liquid nutrient solution, dry nutrient mix, or water.

In some embodiments, when an liquid nutrient solution, activated dry nutrient mix, or activated water is applied to *cannabis*, by the end of a growing season, the treated *cannabis* product has a 1% to 400% higher nutrient concentration or mass relative to *cannabis* crops treated with the same, but unactivated, liquid nutrient solution, dry nutrient mix, or water.

In some embodiments, when an liquid nutrient solution, activated dry nutrient mix, or activated water is applied to *cannabis*, within one hour after said application, the treated *cannabis* has a 50% or greater resistance to pests and pathological microbes to relative to *cannabis* crops treated with the same, but unactivated, liquid nutrient solution, dry nutrient mix, or water.

In some embodiments, when an liquid nutrient solution, activated dry nutrient mix, or activated water is applied to *cannabis*, by the end of a growing season, a portion of the plurality of said *cannabis* has an increased yield per hectare in a range of 5% to 100% relative to agricultural products cultivated with the same, but unactivated, liquid nutrient solution, dry nutrient mix, or water.

In some embodiments, when an liquid nutrient solution, activated dry nutrient mix, or activated water is applied to *cannabis*, within one hour after said application, a portion of the *cannabis* has an increased Brix degree in a range of 5% to 75% relative to *cannabis* cultivated with the same, but unactivated, liquid nutrient solution, dry nutrient mix, or water.

In an embodiment, the agricultural product or crops include, but are not limited to, *cannabis*, hemp and its varietals. *Cannabis* refers to the plant genus *cannabis* including three species or subspecies—*sativa, indica* and *ruderalis*. For the present specification, the term *cannabis* comprises any part of the plant genus *cannabis* whether growing or not, the seeds thereof, the resin extracted from any part of the plant, including hashish and hash oil, any compound, manufacture, salt, derivative, mixture, or preparation of the plant, its seeds or resin. It includes the mature stalks of the plant, fiber produced from the stalks, oil or cake made from the seeds of the plant, any other compound, manufacture, salt, derivative, mixture, or preparation of the mature stalks, or a sterilized seed of the plant which is incapable of germination.

In some embodiments, when an activated liquid nutrient solution, activated dry nutrient mix, or activated water is applied to *cannabis*, by the end of the growing season, the treated *cannabis* has an increased yield per pound in a range of 5% to 75% relative to *cannabis* crops treated with the same, but unactivated, liquid nutrient solution, dry nutrient mix, or water.

Nutrient/Water Preparation

In an embodiment, a container of 400 liters of the nutrient formulation was treated with an array of four lasers. Each laser had a wavelength of 674 nanometers and a power output in the range of 1.9 to 5.2 milliwatts after passing through the optical device when adjusted for the minimum degree of phase cancellation of the laser output.

In an embodiment, a container of 400 liters of water was treated with an array of four lasers. Each laser had a wavelength of 674 nanometers and a power output in the range of 1.9 to 5.2 milliwatts after passing through the optical device when adjusted for the minimum degree of phase cancellation of the laser output.

All four beams were applied to the container of either nutrient solution or water at a trajectory allowing a full traverse of the beam from the surface to the bottom or opposite side of the container or conduit carrying the nutrient solution. In one embodiment, application time of the beam was 20 minutes for each system. Thus, there was approximately 96 milliwatt-minutes of visible residual beam applied to 400 liters of nutrient solution or water to complete the treatment, or about 0.24 milliwatt-minutes per liter.

Exemplary Protocol 1: *Cannabis* (Strain: Super Silver Haze, Sample Type Flower

In an embodiment, a nutrient formulation or solution was prepared consisting of one or more of the aforementioned nutrient or fertilizer components. It should be appreciated that in various embodiments the nutrient formulation or solution can be organic or non-organic.

In one embodiment, a container of 400 liters of the nutrient formulation was treated with an array of four lasers. Each laser had a wavelength of 674 nanometers and a power output in the range of 1.9 to 5.2 milliwatts after passing through the optical device when adjusted for the minimum degree of phase cancellation of the laser output.

All four beams were applied to the nutrient solution at a trajectory allowing a full traverse of the beam from the surface to the bottom or opposite side of the container or conduit carrying the nutrient solution. In one embodiment, application time of the beam was 20 minutes for each system. Thus, there was approximately 96 milliwatt-minutes of visible residual beam applied to 400 liters of nutrient solution to complete the treatment, or about 0.24 milliwatt-minutes per liter.

The nutrient formulation, thus activated by photoacoustic resonance (PAR), was then studied for its effects on a *cannabis* test group and compared with a *cannabis* control group that is treated with the un-activated nutrient formula.

The nutrient formulation, thus activated by photoacoustic resonance (PAR), was then studied for its effects on *cannabis* (strain: super silver haze, sample type: flower) compared to control *cannabis* (strain: super silver haze, sample type: flower). There were 10 plants in each of the control and test groups. *Cannabis* plants, in the control and test groups, were characterized by a growing period ranging from 45 to 60 days (as determined by the rate of growth), a flowering period of 56 to 60 days followed by a drying period of 1 week in a drying room with circulating air and an additional 2 to 4 weeks in plastic film bags.

The test group was treated with activated or laser enhanced formula foliar sprayed two times per week at 5 PM throughout the growing and flowering cycle. An initial application of the activated formula was started 7 to 10 days following permanent transplant. The activated formula was provided in concentrated form which was diluted 10 ml to 1 liter of water (ratio of 1 to 100) for the foliar spray. During the growing phase water used to dilute the activated formula was in a pH range of 6.8 to 7 while during the flowering phase the pH range of the water was in a range of 5 to 6. The concentrated activated formula used for treating the test group was stored at a separation space of at least 33 feet from un-activated formula used for treating the control group as well as conventional fertilizers and/or nutrients. The tracks for the test and control plants were also isolated from each other by at least 33 feet.

The control group was treated with un-activated formula and was provided with the same growing conditions as the test group in terms of water, light exposure and conventional fertilizers and/or nutrients.

In one embodiment, 10 flowers from each of the control and test groups were chosen randomly and analyzed for their terpenes concentration.

Figure 5:
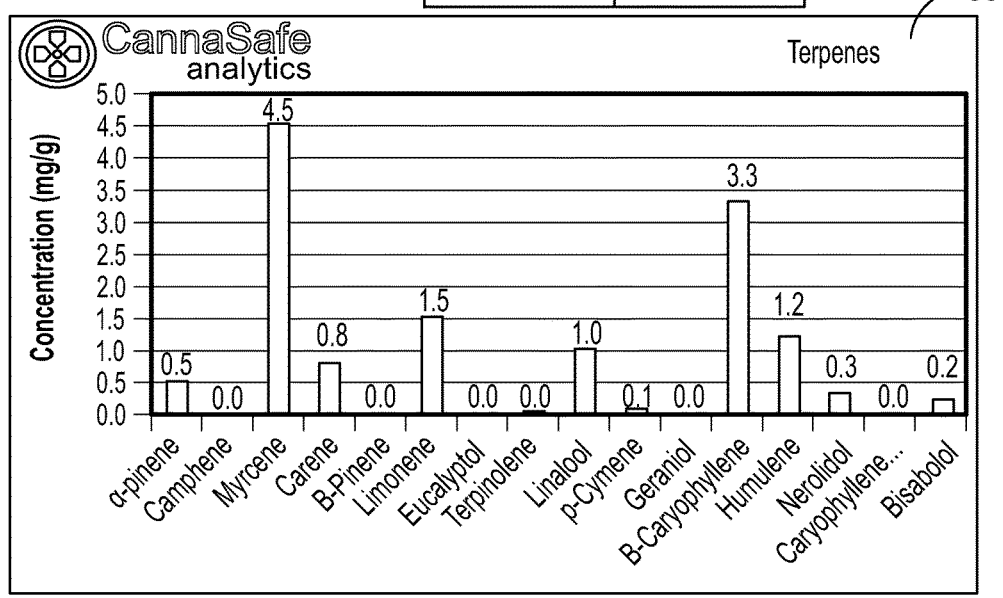
FIG. 5 illustrates a table and a graph of a plurality of terpenes and their respective concentrations for *cannabis* flowers for control plants.
Figure 6:
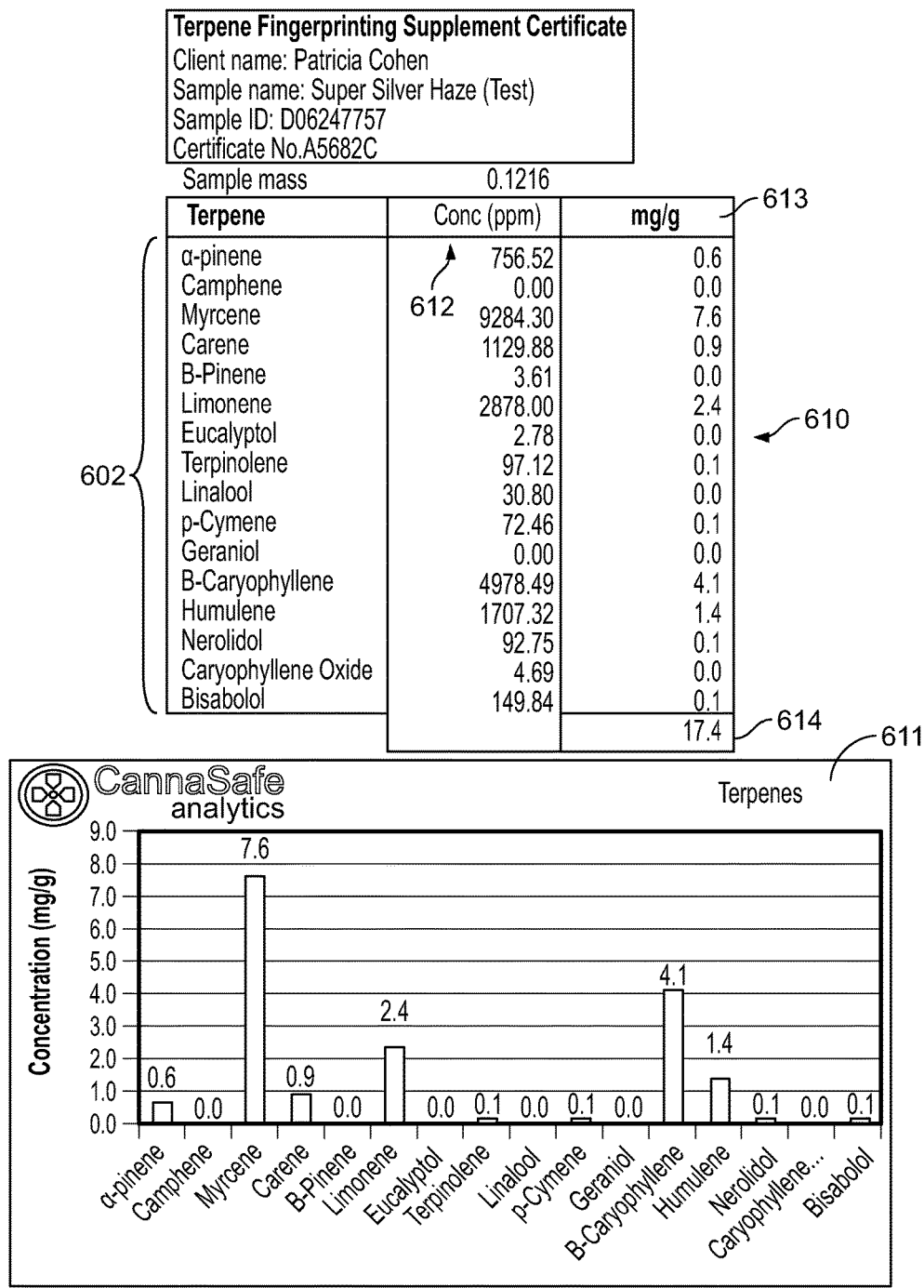
FIG. 6 illustrates a table and a graph of the plurality of terpenes and their respective concentrations for *cannabis* flowers for test plants.

FIG. 5 shows a first table 505 and an associated first graph 506 of a plurality of terpenes 502 and their respective concentrations in ppm 507 (parts per million) and mg/g 508 based on an analysis of the flowers taken from the control group. FIG. 6 shows a second table 610 and an associated second graph 611 of the plurality of terpenes 602 and their respective concentrations in ppm 612 (parts per million) and mg/g 613 based on an analysis of the flowers taken from the test group. Comparing tables 505, 610 (and the respectively associated graphs 506, 611), in accordance with an aspect, the total concentration 614 of the plurality of terpenes 602 in the test group is increased compared to the corresponding total concentration 509 of the plurality of terpenes 502 in the control group. It should be appreciated that terpenes are considered to have medicinal or beneficial pharmacological characteristics without significant harmful side effects and/or reduce the side-effects of other toxic constituents of *cannabis*. Therefore, an increase in concentration of the terpenes is desirable.

In some embodiments, a concentration of at least the following terpenes is modulated: alpha-pinene increases from 0.5 mg/g in the control group to 0.6 mg/g in the test group representing about 20% increase, myrcene increases from 4.5 mg/g in the control group to 7.6 mg/g in the test group representing about 69% increase, carene increases from 0.8 mg/g in the control group to 0.9 mg/g in the test group representing about 13% increase, limonene increases from 1.5 mg/g in the control group to 2.4 mg/g in the test group representing about 60% increase, terpinolene increases from 0.0 mg/g in the control group to 0.1 mg/g in the test group, B-caryophyllene increases from 3.3 mg/g in the control group to 4.1 mg/g in the test group representing about 24% increase, humulene increases from 1.2 mg/g in the control group to 1.4 mg/g in the test group representing about 17% increase.

In some embodiments, concentration of at least the following terpenes, in the test group, increases by at least 1% compared to the control group: alpha-pinene, myrcene, carene, limonene, terpinolene, B-caryophyllene, humulene.

In some embodiments, a concentration of total terpenes increases from 13.6 mg/g in the control group to 17.4 mg/g in the test group representing an increase of about 28%. In some embodiments, compared to the control group a concentration of total terpenes is increased by at least 3 mg/g in the test group. In some embodiments, compared to the control group a concentration of total terpenes is increased by at least 20% in the test group. In some embodiments, compared to the control group a concentration of total terpenes is increased by at least 1% in the test group In some embodiments, 10 plants from the control group yielded 3.4 pounds of *cannabis* flower while 10 plants from the test group yielded 4.7 pounds of *cannabis* flower. In some embodiments, compared to the control group a *cannabis* flower yield from 10 plants is increased by 1.3 pounds representing an increase of about 38%. In some embodiments, compared to the control group a *cannabis* flower yield from 10 plants is increased by at least 1%.

In some embodiments, concentration of at least the following terpenes, in the test group, is improved compared to the control group: alpha-pinene increases by 0.1 mg/g or at least 1%, myrcene increases by 3.1 mg/g or at least 1%, carene increases by 0.1 mg/g or at least 1%, limonene increases by 0.9 mg/g or at least 1%, terpinolene increases by 0.1 mg/g or at least 1%, B-caryophyllene increases by 0.8 mg/g or at least 1%, humulene increases by 0.2 mg/g or at least 1%.

In some embodiments, a concentration of total terpenes, in the test group, increases by 3.8 mg/g or at least 1% compared to the control. In some embodiments, compared to the control group a concentration of total terpenes is increased by at least 3 mg/g in the test group. In some embodiments, compared to the control group a concentration of total terpenes is increased by at least 20% in the test group.

Exemplary Protocol 2: *Cannabis* (Strain: Blackberry; Sample Type: Flower)

In an embodiment, a nutrient formulation or solution was prepared consisting of one or more of the aforementioned nutrient or fertilizer components. It should be appreciated that in various embodiments the nutrient formulation or solution can be organic or non-organic.

In one embodiment, a container of 400 liters of the nutrient formulation was treated with an array of four lasers. Each laser had a wavelength of 674 nanometers and a power output in the range of 1.9 to 5.2 milliwatts after passing through the optical device when adjusted for the minimum degree of phase cancellation of the laser output.

In an embodiment, a container of 400 liters of water was treated with an array of four lasers. Each laser had a wavelength of 674 nanometers and a power output in the range of 1.9 to 5.2 milliwatts after passing through the optical device when adjusted for the minimum degree of phase cancellation of the laser output. Thus, for this experiment, only water was activated by photoacoustic resonance (PAR) (to generate activated or lasered water) under the same laser conditions as were used to activate the nutrient formulation or solution.

All four beams were applied to the nutrient solution or water at a trajectory allowing a full traverse of the beam from the surface to the bottom or opposite side of the container or conduit carrying the nutrient solution. In one embodiment, application time of the beam was 20 minutes for each system. Thus, there was approximately 96 milliwatt-minutes of visible residual beam applied to 400 liters of nutrient solution to complete the treatment, or about 0.24 milliwatt-minutes per liter.

The nutrient formulation, thus activated by photoacoustic resonance (PAR), was then studied for its effects on a *cannabis* first test group and compared with a *cannabis* second test group that was treated with activated or lasered water and with a *cannabis* control group that was treated with unactivated nutrient formula. There were 10 plants in each of the control group, first test group and second test group. *Cannabis* plants, in the three groups, were characterized by a growing period ranging from 45 to 60 days (as determined by the rate of growth), a flowering period of 56 to 60 days followed by a drying period of 1 week in a drying room with circulating air and an additional 2 to 4 weeks in plastic film bags.

The first test group was treated with activated or laser enhanced formula foliar sprayed two times per week at 5 PM throughout the growing and flowering cycle. An initial application of the activated formula was started 7 to 10 days following permanent transplant. The activated formula was provided in concentrated form which was diluted 10 ml to 1 liter of water (ratio of 1 to 100) for the foliar spray. During the growing phase water used to dilute the activated formula was in a pH range of 6.8 to 7 while during the flowering phase the pH range of the water was in a range of 5 to 6.

The second test group was treated with activated or lasered water foliar sprayed two times per week at 5 PM throughout the growing and flowering cycle. An initial application of the activated water was started 7 to 10 days following permanent transplant. The activated or lasered water was provided in 5 gallon containers and applied without dilution.

The control group was treated with unactivated formula foliar sprayed two times per week at 5 PM throughout the growing and flowering cycle. An initial application of the unactivated formula was started 7 to 10 days following permanent transplant. The unactivated formula was provided in concentrated form which was diluted 10 ml to 1 liter of water (ratio of 1 to 100) for the foliar spray. During the growing phase water used to dilute the unactivated formula was in a pH range of 6.8 to 7 while during the flowering phase the pH range of the water was in a range of 5 to 6.

The concentrated activated formula, activated water and unactivated formula were stored at a separation space of at least 33 feet from each other as well as from conventional fertilizers and/or nutrients used for treating the three groups. The tracks for the first test, second test and control plants were also isolated from each other by at least 33 feet. All three groups were provided with the same growing conditions in terms of water, light exposure and conventional fertilizers and/or nutrient schedules.

Figure 7A:
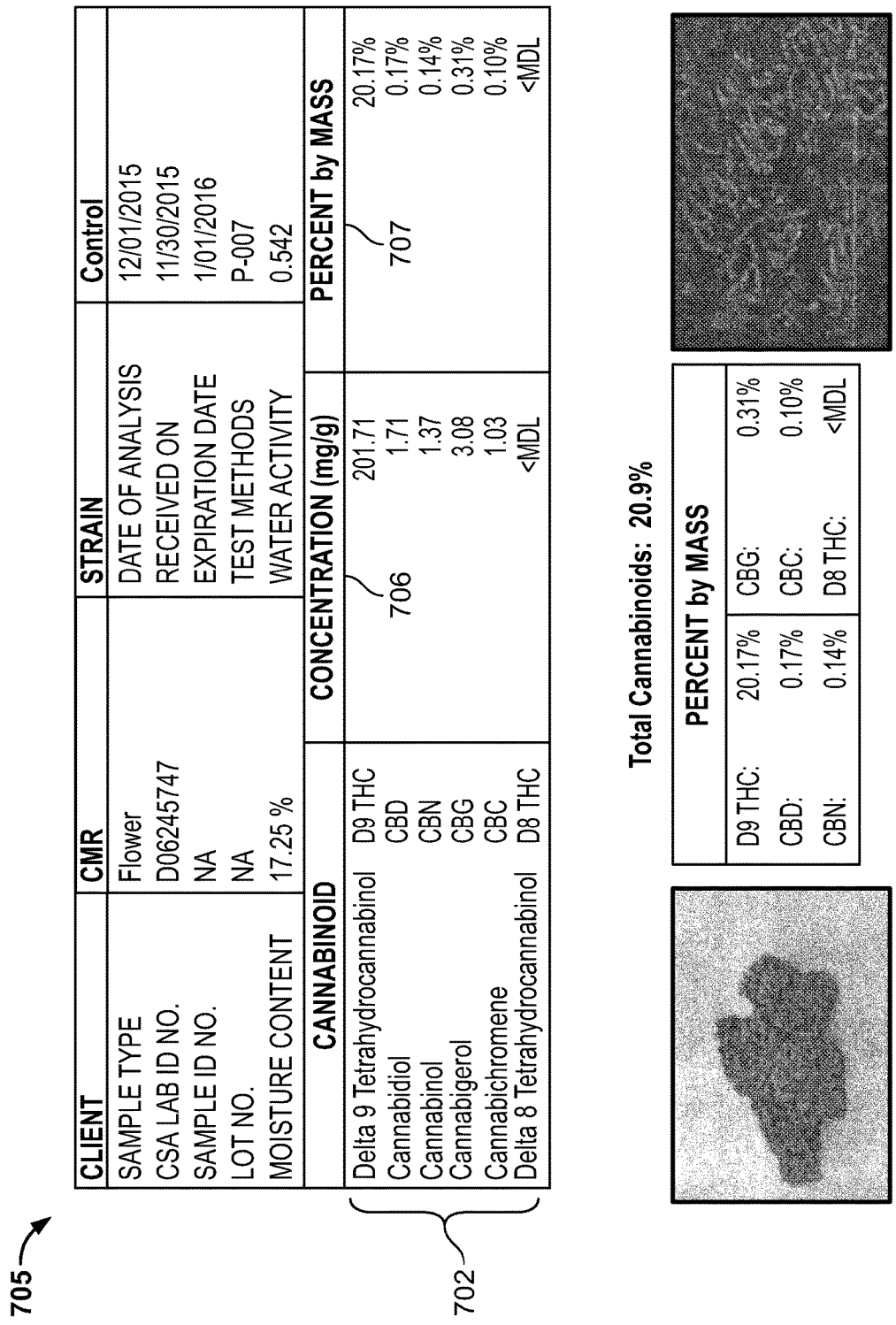
FIG. 7A illustrates a table of a plurality of cannabinoids and their respective concentrations for *cannabis* flowers for control plants.
Figure 7B:
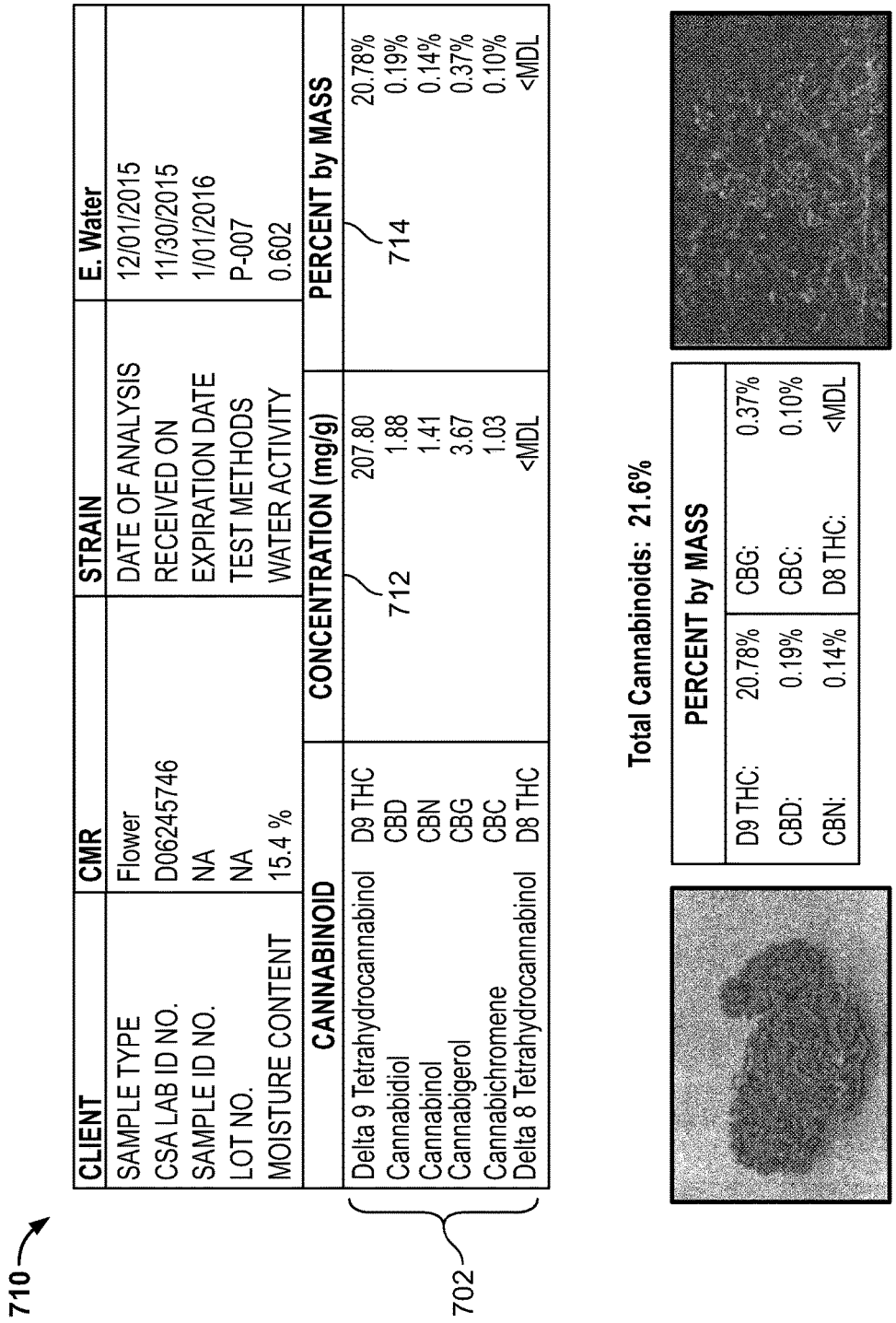
FIG. 7B illustrates a table of the plurality of cannabinoids and their respective concentrations for *cannabis* flowers for a first group of test plants, treated with a laser-activated nutrient formula.

In one embodiment, 10 flowers from each of the control group, first test group and second test group were chosen randomly and analyzed for their cannabinoid concentration. FIG. 7A shows a first table 705 of a plurality of cannabinoids 702 and their respective concentrations in mg/g 706 and percent by mass 707 based on an analysis of the flowers taken from the control group. FIG. 7B illustrates a second table 710 of the plurality of cannabinoids 702 and their respective concentrations in mg/g 712 and percent by mass 714 based on an analysis of the flowers taken from the second test group (that was treated with activated or lasered water). FIG. 7C illustrated a third table 715 of the plurality of cannabinoids 702 and their respective concentrations in mg/g 718 and percent by mass 720 based on an analysis of the flowers taken from the first test group (that was treated with activated formula).

Comparing tables 705, 710, 715, in accordance with an aspect, the concentration of at least the following cannabinoids is modulated: D9-THC increases from 201.71 mg/g (20.17% by mass) in the control group and 207.80 mg/g (20.78% by mass) in the second test group to 218.35 mg/g (21.83% by mass) in the first test group; and Cannabinol increases from 1.37 mg/g (0.14% by mass) in the control group and 1.41 mg/g (0.14% by mass) in the second test group to 2.61 mg/g (0.26% by mass) in the first test group. The increase in the concentration of the cannabinoids in the first test group, compared to the control and second test group is also evident in a corresponding increase in total cannabinoids concentration from 20.9% in the control group and 21.6% in the second test group to 22.6% in the first test group.

In other words, the concentration of at least the following cannabinoids, in the first test group, improves compared to the control group: D9-THC increases by 16.64 mg/g representing an improvement of about 8%, and Cannabinol increases by 1.24 mg/g representing an improvement of about 91%. In some embodiments, concentration of at least the following cannabinoids, in the first test group, increases by at least 1% compared to the control group.

Figure 8A:
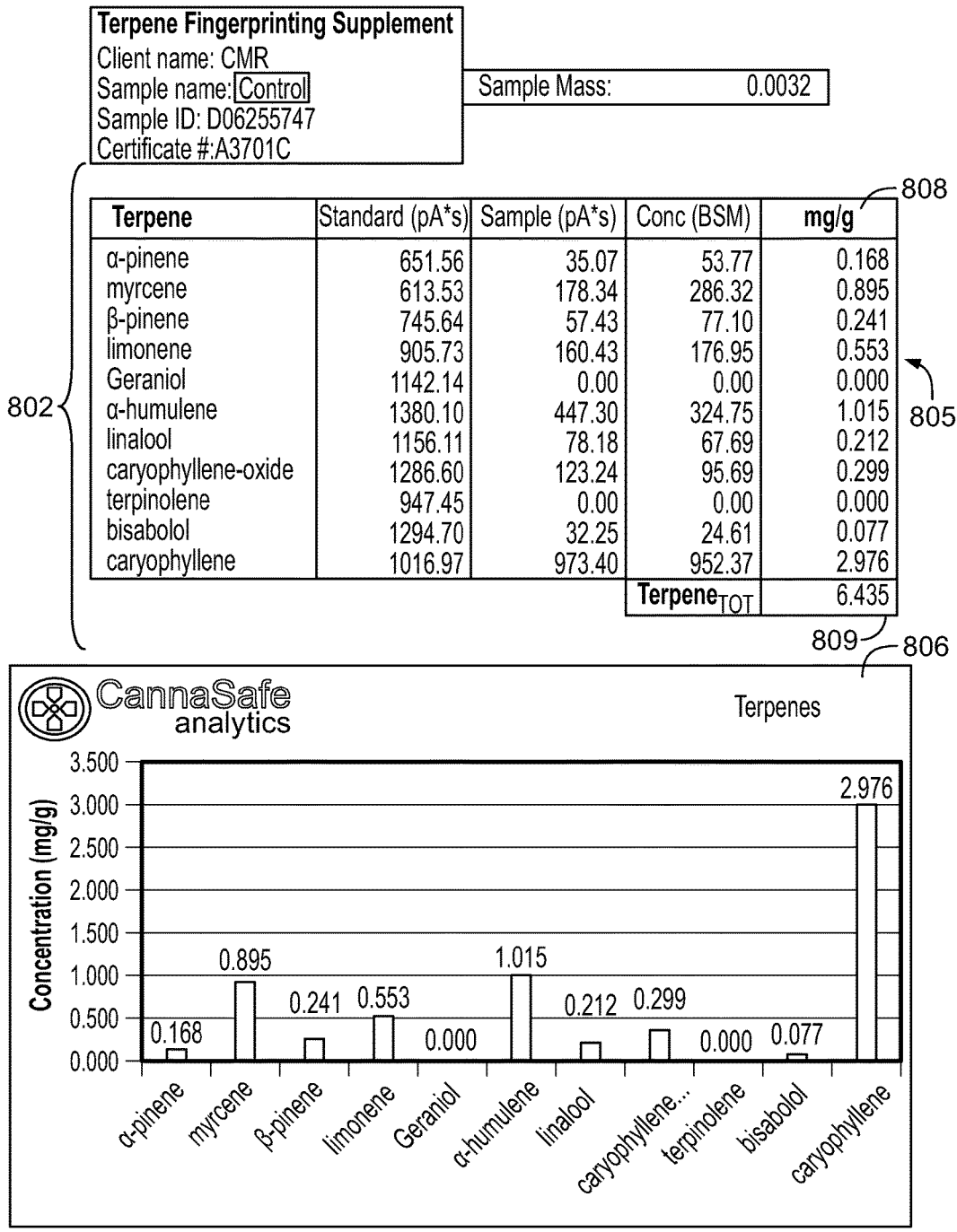
FIG. 8A illustrates a table of a plurality of terpenes and their respective concentrations for *cannabis* flowers for control plants of FIG. 7A; and, FIG. 8B illustrates a table of the plurality of terpenes and their respective concentrations for *cannabis* flowers for a second group of test plants, treated with laser-activated water, of FIG. 7C.
Figure 8B:
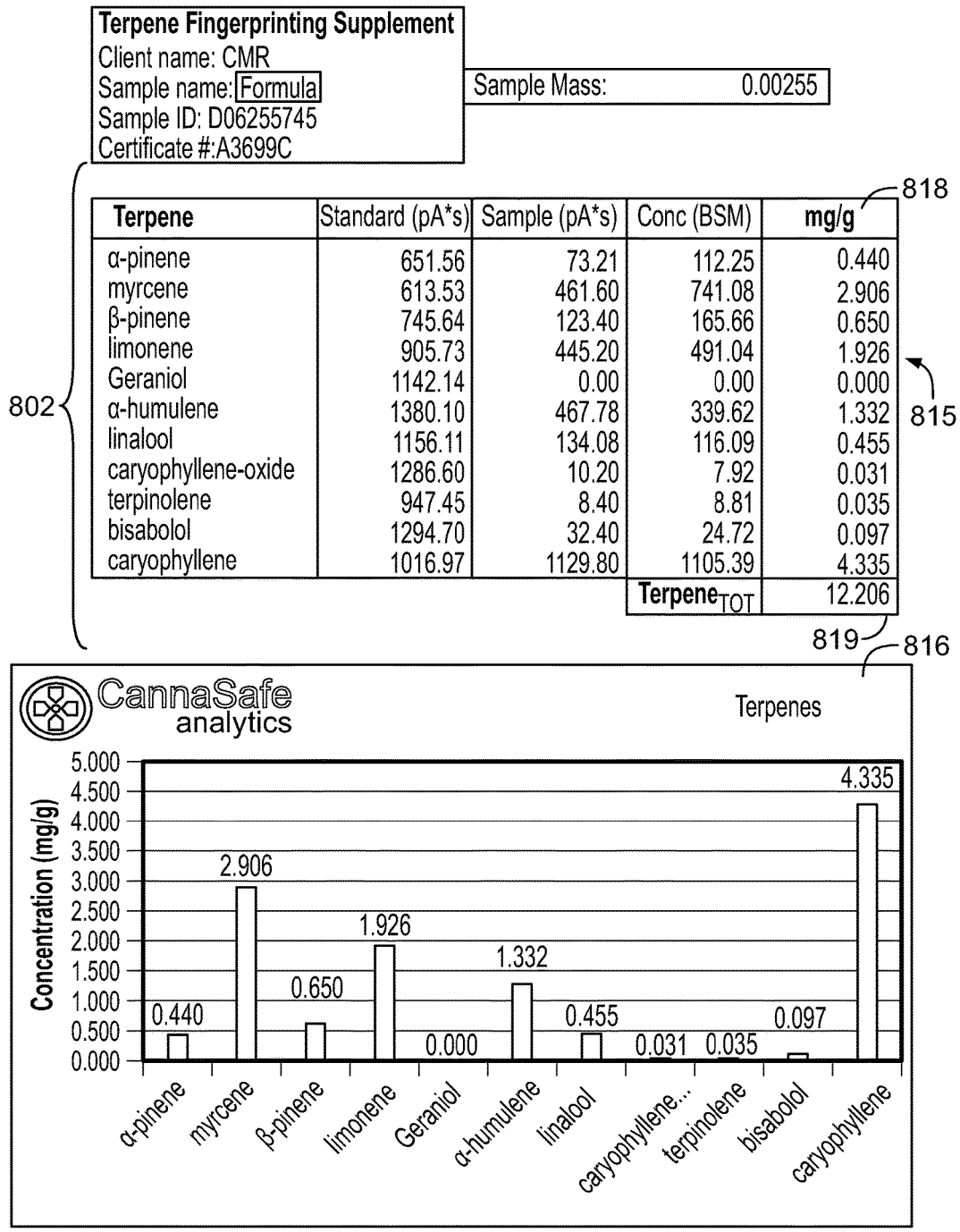

FIG. 8A shows a first table 805 and an associated first graph 806 of a plurality of terpenes 802 and their respective concentrations in mg/g 808 based on an analysis of the flowers taken from the control group. FIG. 8B shows a second table 815 and an associated second graph 816 of the plurality of terpenes 802 and their respective concentrations in mg/g 818 based on an analysis of the flowers taken from the first test group.

Comparing tables 805, 815 (and the respectively associated graphs 806, 816), in accordance with an aspect, the total concentration 819 of the plurality of terpenes 802 in the first test group is increased compared to the corresponding total concentration 809 of the plurality of terpenes 802 in the control group. It should be appreciated that terpenes are considered to have medicinal or beneficial pharmacological characteristics without significant harmful side effects and/or reduce the side-effects of other toxic constituents of cannabis. Therefore, an increase in concentration of the terpenes is desirable.

In some embodiments, concentration of at least the following terpenes is modulated: alpha-pinene increases from 0.168 mg/g in the control group to 0.440 mg/g in the first test group representing about 162% increase, myrcene increases from 0.895 mg/g in the control group to 2.906 mg/g in the first test group representing about 225% increase, beta-pinene increases from 0.241 mg/g in the control group to 0.650 mg/g in the first test group representing about 170% increase, limonene increases from 0.553 mg/g in the control group to 1.926 mg/g in the first test group representing about 248% increase, alpha-humulene increases from 1.015 mg/g in the control group to 1.332 mg/g in the first test group representing about 31% increase, linalool increases from 0.212 mg/g in the control group to 0.455 mg/g in the first test group representing about 115% increase, terpinolene increases from 0.000 mg/g in the control group to 0.035 mg/g in the first test group, bisabolol increases from 0.077 mg/g in the control group to 0.097 mg/g in the first test group representing about 26% increase, caryophyllene increases from 2.976 mg/g in the control group to 4.335 mg/g in the first test group representing about 46% increase.

In some embodiments, concentration of at least the following terpenes, in the first test group, increases by at least 1% compared to the control group: alpha-pinene, myrcene, carene, beta-pinene, limonene, alpha-humulene, linalool, terpinolene, bisabolol, and caryophyllene.

In some embodiments, concentration of at least the following terpenes, in the first test group, is improved compared to the control group: alpha-pinene increases by 0.272 mg/g or at least 1%, myrcene increases by 2.011 mg/g or at least 1%, beta-pinene increases by 0.409 mg/g or at least 1%, limonene increases by 1.373 mg/g or at least 1%, alpha-humulene increases by 0.317 mg/g or at least 1%, linalool increases by 0.243 mg/g or at least 1%, terpinolene increases by 0.035 mg/g or at least 1%, bisabolol increases by 0.02 mg/g or at least 1%, caryophyllene increases by 1.359 mg/g or at least 1%.

In some embodiments, a concentration of total terpenes increases from 6.435 mg/g in the control group to 12.206 mg/g in the first test group representing about 90% increase. In some embodiments, compared to the control group a concentration of total terpenes is increased by at least 3 mg/g in the first test group. In some embodiments, compared to the control group a concentration of total terpenes is increased by at least 20% in the first test group. In some embodiments, compared to the control group a concentration of total terpenes is increased by 5.771 mg/g in the first test group. In some embodiments, compared to the control group a concentration of total terpenes is increased by at least 1% in the first test group.

In some embodiments, 10 plants from the control group yielded 9.83 pounds (4464 g) of cannabis flower while 10 plants from a second test group (laser-activated water) yielded 13.72 pounds (6620 g) of cannabis flower and 10 plants from a first test group (laser-activated nutrient solution) yielded 14.71 pounds (6680 g) of cannabis flower. In some embodiments, compared to the control group a cannabis flower yield from 10 plants is increased by 3.89 pounds, in the second test group, representing an increase of about 40%. In some embodiments, compared to the control group a cannabis flower yield from 10 plants is increased by 4.88 pounds, in the first test group, representing an increase of about 50%. In some embodiments, compared to the control group a cannabis flower yield from 10 plants is increased by at least 1% in the first and second test groups.

GENERAL OBSERVATIONS

Additional tests across different types of cannabis, including varieties or strains of cannabis, have shown that in every instance there is a significant increase in the growth of the plant and the level of yield and quality of that yield with laser activated, as opposed to non-activated nutrient formulas.

In accordance with various aspects of the present specification, treatment of *cannabis* using the activated nutrient solution or formulation (whether laser treated dry fertilizer, wet fertilizer, or just water) results in:

Increased yields of *cannabis* plant (as a whole) in a range of 5% to 75%, including any increment therein, relative to *cannabis* plant treated with the same, but unactivated, liquid nutrient solution, dry nutrient mix, or water.

Enhanced transport of nutrients to the cells of *cannabis* plant, in a range of 5% to 400% including any increment therein, relative to *cannabis* treated with the same, but unactivated, liquid nutrient solution, dry nutrient mix, or water.

Increased amount of each of the *cannabis* constituents, listed in Table 2, in a range of 5% to 75% including any increments therein, relative to the constituents in *cannabis* treated with the same, but unactivated, liquid nutrient solution, dry nutrient mix, or water.

Increased density of *cannabis* constituents: Cannabinoids, Flavonoids, Terpenoids, in a range of 5% to 400% including any increment therein, relative to the constituents in *cannabis* treated with the same, but unactivated, liquid nutrient solution, dry nutrient mix, or water.

Increased Brix degree of *cannabis* plant, in a range of 5% to 75% including any increment therein, relative to *cannabis* plant treated with the same, but unactivated, liquid nutrient solution, dry nutrient mix, or water.

Relative to control *cannabis*, decreased concentration or percentages of *cannabis* constituents having significant harmful side effects or psychoactive, toxic constituents such as, but not limited to, the cannabinoids: delta-9-tetrahydrocannabinol (9-THC) and delta-8-tetrahydrocannabinol (8-THC).

Relative to control *cannabis*, increased concentration or percentages of *cannabis* constituents having medicinal or beneficial pharmacological characteristics without significant harmful side effects and/or that reduce the side-effects of other toxic constituents of *cannabis*. Such beneficial components comprise, for example, cannabinoids such as cannabigerolic acid, cannabigerol, cannabichromene, cannabidiolic acid, cannabidiol, cannabinol, delta-8-tetrahydrocannabinol-11-oic acid. Other beneficial classes of components include, for example, nitrogenous compounds, amino acids, proteins, enzymes and glycoproteins, sugars and related compounds, hydrocarbons, simple alcohols, simple aldehydes, simple ketones, simple acids, fatty acids, simple esters and lactones, steroids, terpenoids, non-cannabinoid phenols, flavonoids, vitamin K, pigments and elements—each of these classes and constituents thereof have been described in detail earlier in this specification.

The various embodiments of the present specification have numerous benefits that include increase in yield per hectare, increase in plant medicinal value, reduced input costs due to elimination of chemical fertilizers, improved soil quality and regeneration due to increased nitrogen fixation from the air, reduced requirements for chemical nitrates by as much as 80%, reduced dependency on, or elimination of pesticides, enhanced quality, purification of water table by reducing applied chemicals such as nitrates, greater value per metric ton, and prolonged shelf life. All of the above benefits deliver significant value in the chain of *cannabis* production.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive.

I claim:

1. A method of growing *cannabis* comprising:
applying an activated composition to an untreated *cannabis* crop, wherein said activated composition comprises an amount of photoacoustic energy deposited therein in a range of 0.05 to 5 milliwatt-minutes per liter; and
wherein, after said application, the treated *cannabis* crop exhibits an increased yield in a range of 5% to 50% relative to the untreated *cannabis* crop.

2. The method of claim 1, further comprising:
forming an unactivated composition; and
applying to said unactivated composition a plurality of ultra-rapid impulses of modulated laser light, said ultra-rapid impulses being defined as impulses with molecular traverse rates on the order of 100 nanoseconds to 0.01 femtoseconds.

3. The method of claim 2, wherein said unactivated composition is water.

4. The method of claim 2, wherein said unactivated composition is a dry nutrient mix.

5. The method of claim 2, wherein said unactivated composition is a liquid nutrient solution.

6. The method of claim 1, wherein said treated *cannabis* crop exhibits an increase in concentration of at least one of cannabinoids, nitrogenous compounds, amino acids, proteins, enzymes, glycoproteins, sugars, hydrocarbons, alcohols, aldehydes, ketones, acids, fatty acids, esters, lactones, steroids, terpenoids, non-cannabinoid phenols, flavonoids, vitamins, pigments or elements relative to the untreated *cannabis* crop.

7. The method of claim 1, wherein said treated *cannabis* crop has an increased Brix degree in a range of 5% to 75% relative to the untreated *cannabis* crop.

8. A method of growing *cannabis* comprising:
applying an activated composition to an untreated *cannabis* crop, wherein said activated composition comprises an amount of photoacoustic energy deposited therein in a range of 0.05 to 5 milliwatt-minutes per liter; and
wherein, after said application, at least one of a plurality of cannabinoids constituents of said treated *cannabis* crop has an increased amount in a range of greater than 5% relative to the untreated *cannabis* crop.

9. The method of claim 8, further comprising:
forming an unactivated composition; and
applying to said unactivated composition a plurality of ultra-rapid impulses of modulated laser light, said ultra-rapid impulses being defined as impulses with molecular traverse rates on the order of 100 nanoseconds to 0.01 femtoseconds.

10. The method of claim 9, wherein said unactivated composition is water.

11. The method of claim 9, wherein said unactivated composition is a dry nutrient mix.

12. The method of claim 9, wherein said unactivated composition is a liquid nutrient solution.

13. The method of claim 8, wherein said plurality of cannabinoids constituents comprise at least one of cannabigerolic acid, cannabigerol, cannabichromene, cannabidiolic acid, cannabidiol, or cannabinol.

14. The method of claim 8, wherein said treated *cannabis* crop has an increased Brix degree in a range of greater than 5% relative to the untreated *cannabis* crop.

15. A method of growing *cannabis* comprising:
applying an activated composition to an untreated *cannabis* crop, wherein said activated composition comprises an amount of photoacoustic energy deposited therein in a range of 0.05 to 5 milliwatt-minutes per liter; and
wherein, after said application, at least one of a plurality of terpene constituents of said treated *cannabis* crop is increased by an amount in a range of greater than 5% relative to the untreated *cannabis* crop.

16. The method of claim 15, further comprising:
forming an unactivated composition; and
applying to said unactivated composition a plurality of ultra-rapid impulses of modulated laser light, said ultra-rapid impulses being defined as impulses with molecular traverse rates on the order of 100 nanoseconds to 0.01 femtoseconds.

17. The method of claim 16, wherein said unactivated composition is water.

18. The method of claim 16, wherein said unactivated composition is a dry nutrient mix.

19. The method of claim 16, wherein said unactivated composition is a liquid nutrient solution.

20. The method of claim 15, wherein said plurality of terpene constituents comprise at least one of alpha-pinene, myrcene, carene, beta-pinene, limonene, alpha-humulene, linalool, terpinolene, bisabolol, caryophyllene, or humulene.

21. The method of claim 15, wherein a concentration of total terpene constituents in said treated *cannabis* crop increases by at least 5% relative to the untreated *cannabis* crop.

22. The method of claim 15, wherein said treated *cannabis* crop has an increased Brix degree in a range of at least 5% relative to the untreated *cannabis* crop.

\* \* \* \* \*